United States Patent
Kim et al.

(10) Patent No.: US 9,949,231 B2
(45) Date of Patent: Apr. 17, 2018

(54) ELECTRONIC DEVICE AND METHOD FOR MANAGING INFORMATION OF ELECTRONIC DEVICE

(71) Applicant: Samsung Electronics Co., Ltd., Gyeonggi-do (KR)

(72) Inventors: Hyun-Myung Kim, Gyeonggi-do (KR); Hye-Joong Kang, Gyeonggi-do (KR); Dong-Ryeol Ryu, Gyeonggi-do (KR); Sung-Rae Cho, Gyeonggi-do (KR); Jin-Woo Kim, Seoul (KR); Sang-Uk Park, Seoul (KR); Bum-Soo Lee, Gyeonggi-do (KR); Chae-Man Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/438,172

(22) Filed: Feb. 21, 2017

(65) Prior Publication Data
US 2017/0245240 A1 Aug. 24, 2017

(30) Foreign Application Priority Data
Feb. 19, 2016 (KR) .......................... 10-2016-0020080

(51) Int. Cl.
*H04W 64/00* (2009.01)
*H04W 24/08* (2009.01)

(52) U.S. Cl.
CPC ......... *H04W 64/006* (2013.01); *H04W 24/08* (2013.01)

(58) Field of Classification Search
CPC ........................... H04W 64/006; H04W 24/08
See application file for complete search history.

(56) References Cited

U.S. PATENT DOCUMENTS

| | | | |
|---|---|---|---|
| 5,732,354 A | 3/1998 | MacDonald | |
| 6,799,047 B1 | 9/2004 | Bahl et al. | |
| 6,944,447 B2 | 9/2005 | Portman et al. | |
| 9,277,492 B2* | 3/2016 | Juang | H04W 48/18 |
| 2016/0212612 A1* | 7/2016 | Liang | H04W 4/12 |

* cited by examiner

*Primary Examiner* — Brandon J Miller
(74) *Attorney, Agent, or Firm* — The Farrell Law Firm, P.C.

(57) ABSTRACT

An electronic device is provided, and includes a communication interface and a first processor and a second processor. The first processor may be configured to receive first base station information from base station, search a first memory for first wireless information corresponding to the received first base station information, and when the first wireless information is not searched in the first memory, send a request for second wireless information corresponding to the first base station information to the second processor, and the second processor may be configured to search a second memory for the second wireless information based on the request for the second wireless information. Other various embodiments are also available.

20 Claims, 22 Drawing Sheets

ELECTRONIC DEVICE AND METHOD FOR MANAGING INFORMATION OF ELECTRONIC DEVICE

PRIORITY

This application claims priority under 35 U.S.C. § 119(a) to Korean Patent Application Serial No. 10-2016-0020080, which was filed in the Korean Intellectual Property Office on Feb. 19, 2016, the entire disclosure of which is incorporated herein by reference.

BACKGROUND

1. Field of the Disclosure

The present disclosure relates generally to electronic devices with communication functionality, and more particularly, to methods and apparatuses which use information management for positioning electronic devices.

2. Description of the Related Art

Electronic devices can support various services based on their positions, e.g., user positioning services, routing services, reducing power consumption, and enhancing network connectivity. Such location-based services ("LBSs") encompass all services that may obtain location information of electronic devices.

The global positioning system (GPS) is used to locate a position of user's electronic device. The method may include receiving satellite coordinates-related signals from multiple satellites revolving the earth to obtain the coordinates of each satellite and information regarding the distance from the satellite. An electronic device may be positioned using a trilateration method based on the coordinate and distance information obtained. The GPS provides a good performance outdoors and has broad availability for positioning and guidance services. The GPS-based trilateration method, however, consumes too much power due to the reception and processing of satellite signals by the GPS, rendering it unfit into steady, long-term use for the portable devices that utilize it.

Additionally, such GPS-based positioning of an electronic device is inadequate for use in portable devices which are located in downtown areas that are compacted with tall buildings, which may result lowering in accuracy, e.g., due to a difficulty in securing a line of sight (LOS) of satellite signals.

Further, cellular signal-based positioning is subject to significant deterioration or variation in positioning capability because radio channel fading causes a distance between the transmission point of a cell and the electronic device not to be directly related to the strength or round trip time of received signals.

Moreover, cell location information necessary for positioning the electronic device is retained in a memory or storage space simply in the form of a table, and whenever necessary, is read out. However, the data structure of a database could be impossible to represent in a simple table or list form for the purpose of positioning highly-advanced electronic devices, and smartphones or other portable devices might have a limited storage space. Furthermore, since an electronic device may have its characteristic and accessible areas separated per processing device, it may present different processing speeds or power consumptions depending on how the information (e.g., database) is managed.

SUMMARY

An aspect of the present disclosure provides an efficient structure of a database and an efficient information management method to implement an efficient positioning algorithm for low-power, cellular signal-based positioning.

In accordance with the present disclosure, there is provided an electronic device. The electronic device includes a communication interface and a first processor and a second processor, wherein the first processor is configured to receive first base station information from a base station, search a first memory for first wireless information corresponding to the received first base station information, and when the first wireless information is not searched in the first memory, send a request for second wireless information corresponding to the first base station information to the second processor, and wherein the second processor is configured to search a second memory for the second wireless information based on the request for the second wireless information.

In accordance with the present disclosure, there is provided a method for managing information by an electronic device. The method includes receiving first base station information from a base station, searching a first memory for first wireless information corresponding to the received first base station information by a first processor including the first memory for storing the first wireless information, when the first wireless information is not searched in the first memory, sending a request for second wireless information corresponding to the first base station information to a second processor, and searching a second memory for the second wireless information based on the request for the second wireless information by the second processor.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
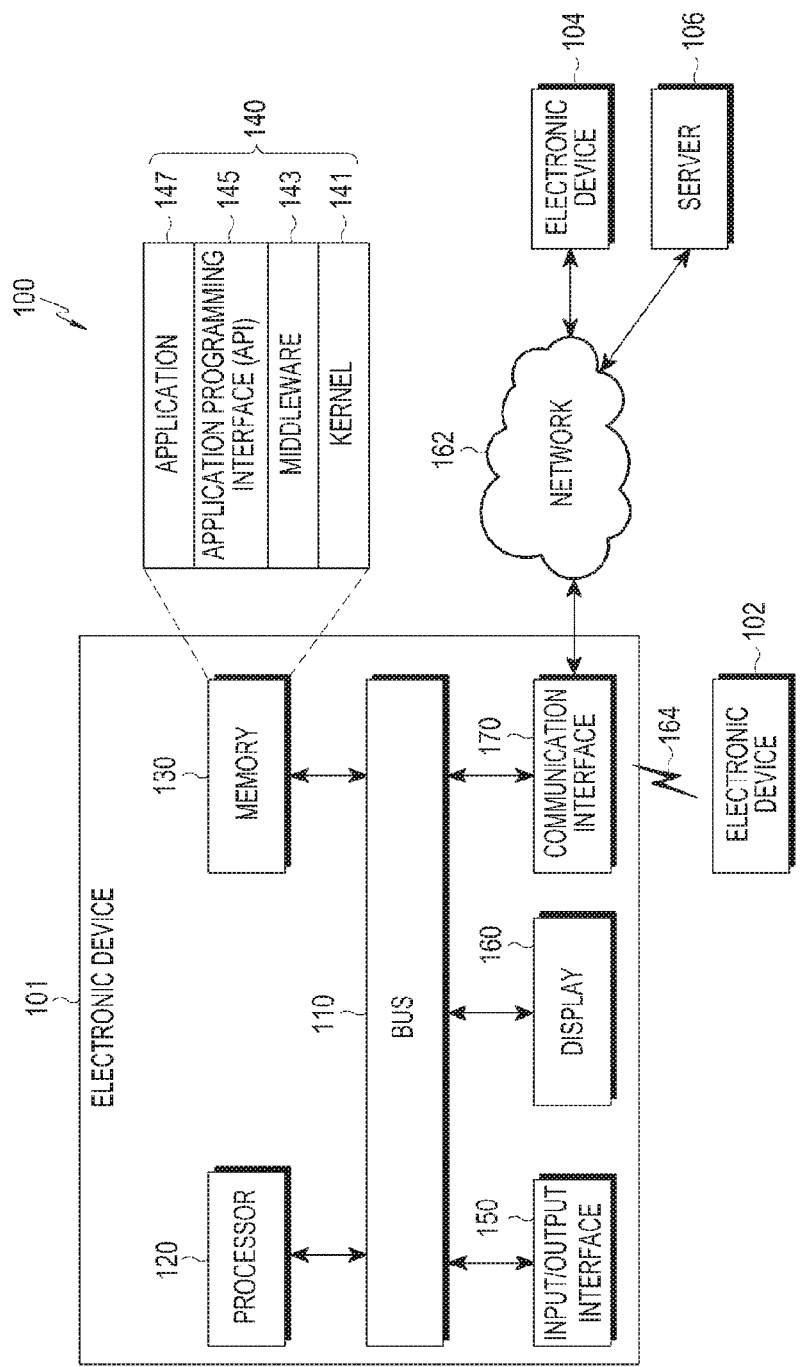
FIG. 1 is a diagram of a network environment including an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device. FIG. 1 is a diagram of a network environment 100 including an electronic device 101, according to an embodiment of the present disclosure. The electronic device 101 includes a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147.

At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application 147 in order of priority. For example, the middleware 143 may assign a priority of using system resources (e.g., bus 110, processor 120, or memory 130) of the electronic device 101 to at least one of the applications 147 and process one or more task requests.

The API 145 is an interface allowing the application 147 to control functions provided from the kernel 141 or the middleware 143. For example, the API 133 may include at least one interface or function (e.g., a command) for filing control, window control, image processing or text control.

For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), bluetooth (BT), BT low energy (BLE), Zigbee, near field communication (NFC), magnetic secure transmission (MST), radio frequency (RF), or body area network (BAN). According to an embodiment of the present disclosure, the wireless communication may include a global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e. g., the electronic devices 102 and 104 or server 106). According to an embodiment of the present disclosure, when the electronic device 101 performs some function or service automatically or at a request, the electronic device 101, instead of executing the function or service on its own or additionally, may request another device (e. g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To this end, a cloud computing, distributed computing, or client-server computing technique may be used.

According to an embodiment of the present disclosure, at least a part of the device (e.g., modules or their functions) or method (e.g., operations) may be implemented as instructions stored in a non-transitory computer-readable storage medium (e.g., the memory 130), e.g., in the form of a program module. The instructions, when executed by a processor (e.g., the processor 120), may enable the processor 120 to carry out a corresponding function. The non-transitory computer-readable medium may include, e.g., a hard disk, a floppy disc, a magnetic medium (e.g., magnetic tape), an optical recording medium (e.g., compact disc read only memory (CD-ROM), digital versatile disc (DVD), magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 2:
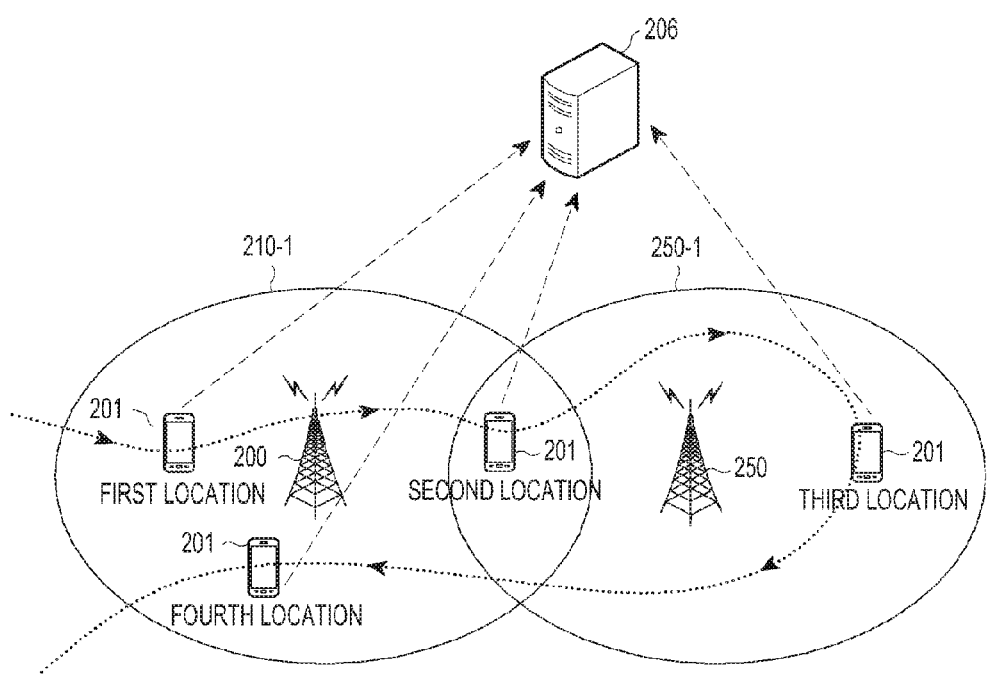
FIG. 2 is a diagram illustrating a movement of an electronic device in a cell managed by a base station, according to an embodiment of the present disclosure.

FIG. 2 is a diagram illustrating a movement of an electronic device 201 in a cell managed by a base station, according to an embodiment of the present disclosure. Referring to FIG. 2, base stations 200 and 250 are shown as examples of transmitting ends to which the electronic device 201 attaches to receive a mobile communication service.

Although the base stations 200 and 250 are shown as transmitting ends in connection with FIG. 2, the transmitting ends are not limited thereto as long as they may provide transmit information to the electronic device 201. For example, the transmitting ends may also be termed access points (APs), nodeBs, eNodeBs, or beacons, as well as stationary base stations 200 and 250 communicating with the electronic device 201. Further, coverage may also be termed a base station and/or cell in the context where the term is used. The base station may have coverage areas different in size or shape that is determinable by various factors, such as topography or obstacles. Coverage is described below in greater detail with reference to FIG. 3.

Referring to FIG. 2, the electronic device 201 moves within at least one coverage area 200-1 or 250-1 managed by at least one transmitting end 200 and 250. The electronic device 201 can be positioned within the coverage 200-1 managed by the transmitting end 200 at a first and fourth position, and the electronic device 201 may obtain transmitting end information about the transmitting end 200 from the transmitting end 200 at the first position. The electronic device 201 can be positioned within the coverage 250-1 managed by the transmitting end 250 at a third position, and the electronic device 201 may obtain transmitting end information about the transmitting end 250 from the transmitting end 250 at the third position. At the second position, the electronic device 201 can be positioned within the coverage 200-1 managed by the transmitting end 200 and the coverage 250-1 managed by the transmitting end 250. At the second position, the electronic device 201 may obtain transmitting end information (e.g., first transmitting end information) about the transmitting end 200 from the transmitting end 200, with the coverage 200-1 of the transmitting end 200 being the serving cell, along with transmitting end information (e.g., second transmitting end information) about the transmitting end 250 from the transmitting end 250, with the coverage 250-1 of the transmitting end 250 being a neighbor cell. The electronic device 201 may store, in a database, the transmitting end information obtained at each position (e.g., the first position, second position third position, and fourth position) and may periodically or aperiodically report the obtained transmitting end information to a server 206. For example, the reporting may be performed when the electronic device 201 and the server 206 establish a communication connection via Wi-Fi.

Referring to FIG. 2, as the electronic device 201 moves from the first position through the second position to the third position in at least one cell area 200-1 or 250-1 managed by at least one transmitting end 200 or 250, the terminal 201 may transmit or receive data through the transmitting end 200 or 250. Conversely, the terminal 201 may transmit or receive data through the transmitting end 200 or 250 while camping at the first to third positions. For example, when the cell area 200-1 or 250-1 is the coverage of a 3GPP LTE system, the electronic device 201 may receive a mobile communication service by the transmitting end 200 or 250 with which the terminal 201 has established a connection.

According to an embodiment of the present disclosure, the position (e.g., coordinates) of the transmitting end 200 or 250 managing at least one coverage area 200-1 or 250-1 where the electronic device 201 is known to have been located may be used as a reference position for positioning the electronic device 201. The coordinates of the transmitting end 200 or 250, although lacking the geographical location of the electronic device 201, may be used upon estimating the position of the electronic device 201. According to an embodiment of the present disclosure, in order to acquire the coordinates of the transmitting end 200 or 250, the location information of the electronic device 201 obtained from a GPS satellite may be used for the transmitting end information obtained by the electronic device 201 from the transmitting end 200 or 250 and the point where the transmitting end information has been obtained. The transmitting end information and the location information are described below in further detail with reference to FIG. 3.

Figure 3:
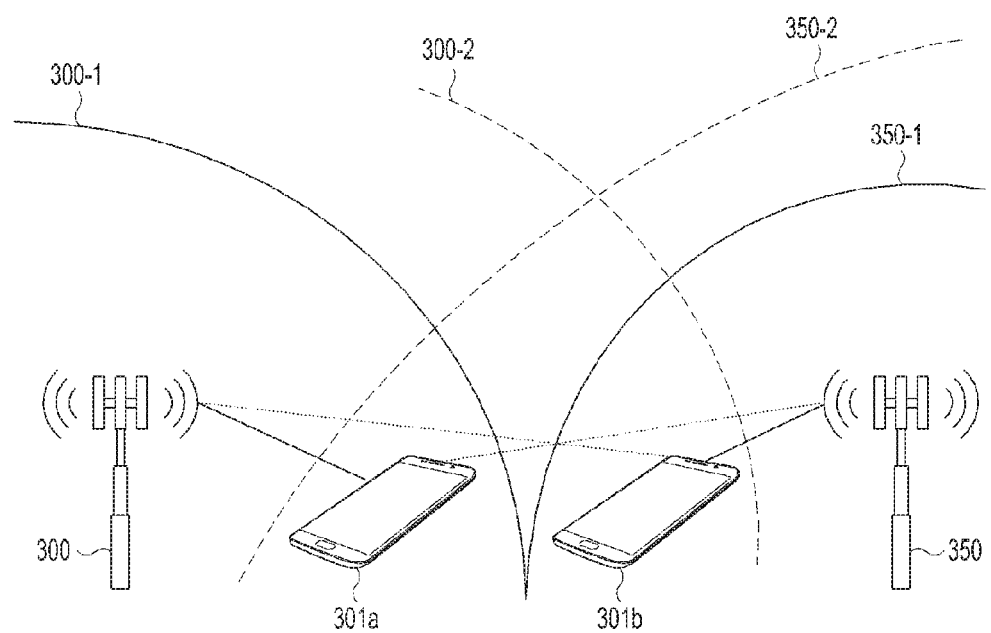
FIG. 3 is a diagram illustrating inner coverage and outer coverage, according to an embodiment of the present disclosure.

FIG. 3 is a diagram illustrating inner coverage and outer coverage, according to an embodiment of the present disclosure.

Referring to FIG. 3, a first transmitting end 300 (e.g., a first base station) may attach and communicate with a first electronic device 301a which is an electronic device positioned within the inner coverage 300-1 of the first transmitting end 300. The first electronic device 301a may access and communicate with the first transmitting end 300. The first cell corresponding to the first transmitting end 300 may be a serving cell for the first electronic device 301a. The first transmitting end 300 cannot attach and communicate with a second electronic device 301b, which is positioned between the inner coverage 300-1 and outer coverage 300-2, and the second electronic device 301b may receive signals from the first transmitting end 300. Accordingly, the first electronic device 301a may attach to the first transmitting end 300 and receive signals from a second transmitting end 350 (e.g., a second base station), and it may belong to the inner coverage 300-1 of the first transmitting end 300 and the outer coverage 350-2 of the second transmitting end 350. The second electronic device 301b may attach to the second transmitting end 350 and receive signals from the first transmitting end 300, and it may belong to the inner coverage 350-1 of the second transmitting end 350 and the outer coverage 300-2 of the first transmitting end 300. One electronic device may belong to the inner coverage of one transmitting end and the outer coverage of a plurality of transmitting ends.

According to an embodiment of the present disclosure, a server (e.g., the server 106 or the server 206) may obtain collection information including the transmitting end information received from at least one transmitting end and the location information regarding the point where the transmitting end information has been received from each of the plurality of electronic devices 301a and 301b. The server (e.g., the server 106 or the server 206) may collect the transmitting end information and location information about various positions of the plurality of electronic devices 301a and 301b through crowd sourcing from the plurality of electronic devices 301a and 301b. The server (e.g., the server 106 or the server 206) may generate a radio map indicating the transmitting end information (e.g., network information, identification information, and measurement information of the transmitting end) corresponding to the location information based on the collected transmitting end information and location information.

The radio map may include a coverage map and a transmitter map. The coverage map may be a radio map for the coverage of at least one transmitting end. The transmitter map may be a radio map for the position (e.g., coordinates) of a transmitting end (e.g., a base station or base station antenna) transmitting a signal containing the transmitting end information corresponding to the coverage in at least one coverage area. As used herein, the term "radio map" may interchangeably be used with the term "radio information."

The coverage corresponding to the area served by one base station or one cell may mathematically be defined as a single closed-loop or probability density function. Thus, according to an embodiment of the present disclosure, the electronic device 301a or 301b or the server (e.g., the server 106 or the server 206) may generate coverage using, e.g., a single closed loop or probability density function. For example, the electronic device 301a or 301b or the server (e.g., the server 106 or the server 206) may form the coverage in one of a circle, an ellipse, or a polygon and may represent the coverage in all probability density functions defined in two dimension. For example, the coverage shape may be generated in various parameters as shown in Table 1 below.

TABLE 1

| Coverage shape | Parameter |
|---|---|
| Circle | Coordinates of center and radius |
| Ellipse | Coordinates of two focuses and sum of distances from the focuses |
| Polygon | Generally for N-polygon, coordinates of N vertexes |
| Normal distribution | Mean and variance (or standard deviation) for longitude and latitude |

Figure 4:
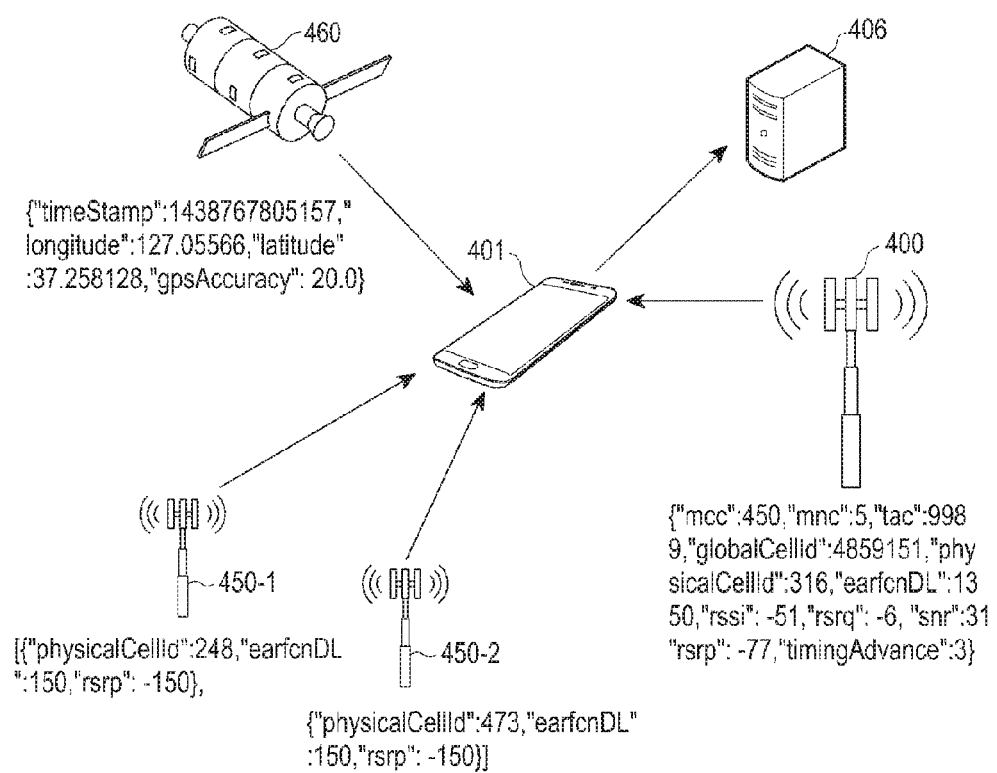
FIG. 4 is a diagram illustrating an example of obtaining transmitting end information and location information by an electronic device, according to an embodiment of the present disclosure.

FIG. 4 is a diagram illustrating an example of obtaining transmitting end information and location information by an electronic device 401, according to an embodiment of the present disclosure.

Referring to FIG. 4, according to an embodiment of the present disclosure, an electronic device 401 may receive, from at least one transmitting end 400, 450-1, or 450-2, transmitting end information for each corresponding transmitting end. Further, the electronic device 401 may receive location information of the electronic device 401 at the point where the transmitting end information has been obtained from at least one positioning system (e.g., a GPS device) 460.

According to an embodiment of the present disclosure, the transmitting end information may include first transmitting end information provided from a first transmitting end 400 (e.g., a base station or base station antenna) corresponding to a serving cell and second transmitting end information provided from each of at least one second transmitting end 450-1 or 450-2 corresponding to a neighbor cell.

According to an embodiment of the present disclosure, the first transmitting end information provided from the first transmitting end 400 corresponding to the serving cell may include first network information, first identification information, and first measurement information for the first transmitting end 400. For example, for LTE, the first network information may include information about at least one of a mobile country code (MCC), a mobile network code (MNC), a radio access technology (RAT), or a tracking area code (TAC). The first identification information may include information about at least one of a global cell identifier (GCI), a physical cell identifier (PCI), or an E-UTRA absolute radio frequency channel number (EARFCN). The first measurement information may include information about at least one of a received signal strength indication (RSSI), a reference signal received quality (RSRQ), a signal to noise ratio (SNR), a reference signal received power (RSRP), or a time advance (TA).

According to an embodiment of the present disclosure, the second transmitting end information provided from each second transmitting end 350-1 or 350-2 corresponding to the neighbor cell may include second cell information about the corresponding second transmitting end 350-1 or 350-2. For example, for LTE, the second cell information may include information about at least one of a PCI, an EARFCH, or a RSRP of each corresponding second transmitting end 350-1 or 350-2.

According to an embodiment of the present disclosure, the location information of the electronic device 401 provided from the positioning system 460 may include at least one of a time stamp for time information, longitude information, latitude information, or location error information (e.g., GPS accuracy). The time information may include the time at the moment that at least one of the first transmitting end information or the second transmitting end information is obtained. The longitude information and latitude information may include the location information about the point where at least one of the first transmitting end information or the second transmitting end information is obtained.

The electronic device 401 may store, in its database, at least part of the received transmitting end information (e.g., the first transmitting end information or the second transmitting end information), and may report at least part of the received transmitting end information or the location information to the server 406. The electronic device 401 may report at least part of the received transmit end information (e.g., the first transmit end information or the second transmit end information) or the location information to the server 406.

According to an embodiment of the present disclosure, the electronic device 401, upon establishing a communication connection with the server 406 through a predetermined communication module (e.g., a Wi-Fi module), may periodically or aperiodically report at least part of the transmitting end information or the location information of the electronic device 401 to the server 406. The server 406 may collect the transmitting end information and location information reported from the electronic device 401 upon establishing a communication connection with the electronic device 401 via the Wi-Fi module, for example. The server 406 may generate various forms of radio maps corresponding to at least one transmitting end 400, 450-1, or 450-2 based on the information collected so and store the radio map in the database of the server 406. The electronic device 401 may send a request for the stored radio map to the server 406 and may estimate its position based on the radio map received in response to the request.

According to an embodiment of the present disclosure, the server 406 may generate various forms of radio maps based on the transmitting end information and location information reported from the electronic device 401. For example, the radio map may include at least one of a radio transmitter map, a radio coverage map, or a radio footprint map. Various forms of radio maps generated by the server 406 are described below in further detail with reference to FIGS. 5A to 5C.

Figure 5A:
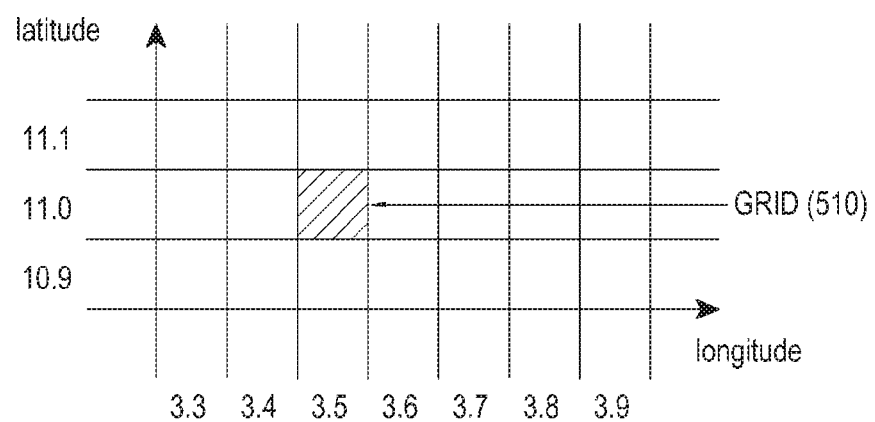
FIG. 5A is a diagram illustrating an example of a grid used in a radio map, according to an embodiment of the present disclosure.
Figure 5B:
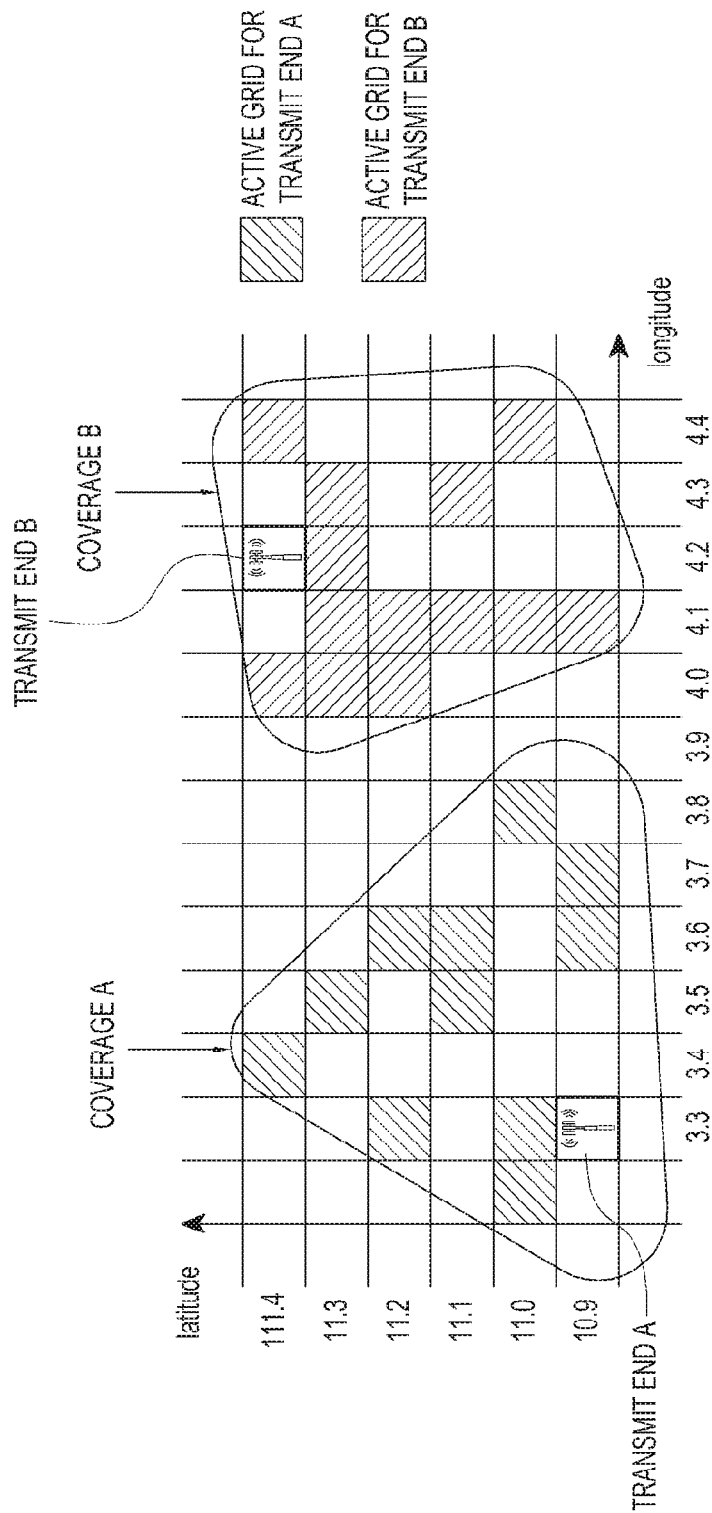
FIGS. 5B and 5C are diagrams illustrating examples of radio maps, according to embodiments of the present disclosure.
Figure 5C:
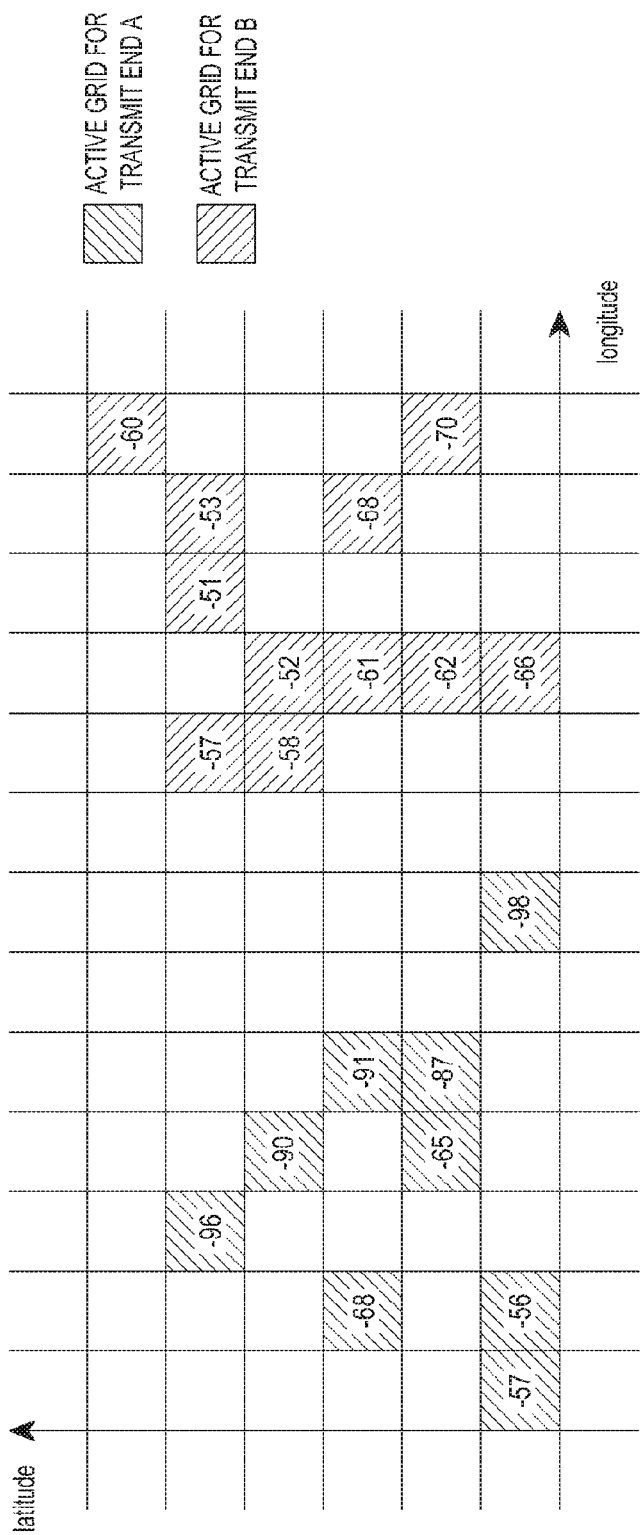

FIG. 5A is a diagram illustrating an example of a grid used in a radio map, according to an embodiment of the present disclosure. FIGS. 5B and 5C are diagrams illustrating examples of radio maps, according to embodiments of the present disclosure.

Referring to FIG. 5A, the server 406 may enable a geographically specific area, e.g., a grid 510 having a predetermined shape and size to, correspond to the received transmitter information. For example, one grid 510 may correspond to one set of coordinates (e.g., (3.5, 11.0)) having a longitude and latitude. Although FIG. 5A illustrates that the grids 510 form a lattice, each of which is split from another and has a size of 0.1 degrees along the longitude and latitude, the grids 510 are not so limited may be split to have various shapes or sizes (intervals). The server 406 may perform quantization so that the transmitting end information and location information collected from the electronic device 401 may correspond to each of the plurality of grids split as shown in FIG. 5A.

Referring to FIG. 5B, the server 406 may map the received transmitting end information to the grid of the longitude and latitude corresponding to each piece of location information received. The server 406, upon reception of the transmitting end information (e.g., cell information) and location information corresponding to a particular transmitting end (e.g., transmitting end A or transmitting end B), may conduct quantization so that the received transmitting end information is mapped to the grid corresponding to the longitude and latitude of each received piece of location information and store the same. The transmitting end information for a plurality of transmitting ends may be stored in one grid, and the transmitting end information for at least one transmitting end received from different electronic devices may be stored as well.

According to an embodiment of the present disclosure, the radio transmitter map may include the location information (e.g., longitudinal or latitudinal coordinates) of the transmitting end sending a signal containing corresponding transmitting end information in one coverage area. For example, the radio transmitter map may include the location information regarding transmitting end A corresponding to coverage A stored in the grid of the coordinates (3.3, 10.9) or the location information regarding transmitting end B corresponding to coverage B stored in the grid of the coordinates (4.2, 11.4). According to an embodiment of the present disclosure, the radio transmitter map may be generated in the form of a table or list constituted of the longitudinal and latitudinal coordinates and ID of each transmitting end (e.g., transmitting end A or transmitting end B).

The server 406, upon receiving the transmitting end information and location information corresponding to a particular transmitting end (e.g., a base station), may determine that the grid corresponding to the location of each of the transmitting end information and location information received is an active grid. Since the transmitting end information about one transmitting end may be received at each of multiple locations by a plurality of electronic devices, one transmitting end may have a plurality of active grids, and a set of active grids for one transmitting end may correspond to the coverage (e.g., coverage A or coverage B) of the transmitting end, and this may be represented in the radio coverage map. For example, each coverage (coverage A or coverage B) of the radio coverage map may be a service area formed by the corresponding transmitting end (transmitting end A or transmitting end B), and the coverage may be shown in various shapes, such as a circle, an ellipse, a rectangle, or a polygon, as stated above in connection with FIG. 3. Further, the coverage, as set forth above in connection with Table 1, may also be shown in a mathematical representation, in which case the radio coverage map may form a more sophisticated radio map.

Referring to FIG. 5C, as an example of a scheme for representing the radio coverage map in a further sophisticated manner, the radio footprint map is shown, wherein the storage of the RSSI, as additional cell information of the transmitting end, in each active grid is shown in number. The radio footprint map may further store information including at least one of a timing advance (TA), a round trip time (RTT), a reference signal received quality (RSRQ), a reference signal received power (RSRP), a reference signal code power (RSCP), or a signal to noise ratio (SNR), as well as the RSSI.

As shown in FIGS. 5A to 5C, the radio map may be stored in various forms, and the radio transmitter map, radio coverage map, and radio footprint map, in the order thereof, may store more information. The radio footprint map, because its amount of information is largest, needs a large storage space to accommodate the information and may be subject to a heaviest time and computational load as required for search and utilization. Further, the radio transmitter map or the radio coverage map may be extracted from the radio footprint map. The radio map may be stored in the electronic device 401 or the server 406. The electronic device 401 may, as necessary, send a request for various types of radio maps (e.g., the radio transmitter map or radio coverage map) to the server 406. The electronic device 401 may receive a corresponding radio map from the server 406 responsive to the request. Further, the received radio map may be stored in the electronic device 401 (e.g., a memory). The received radio map may be used to position the electronic device 401.

Figure 6:
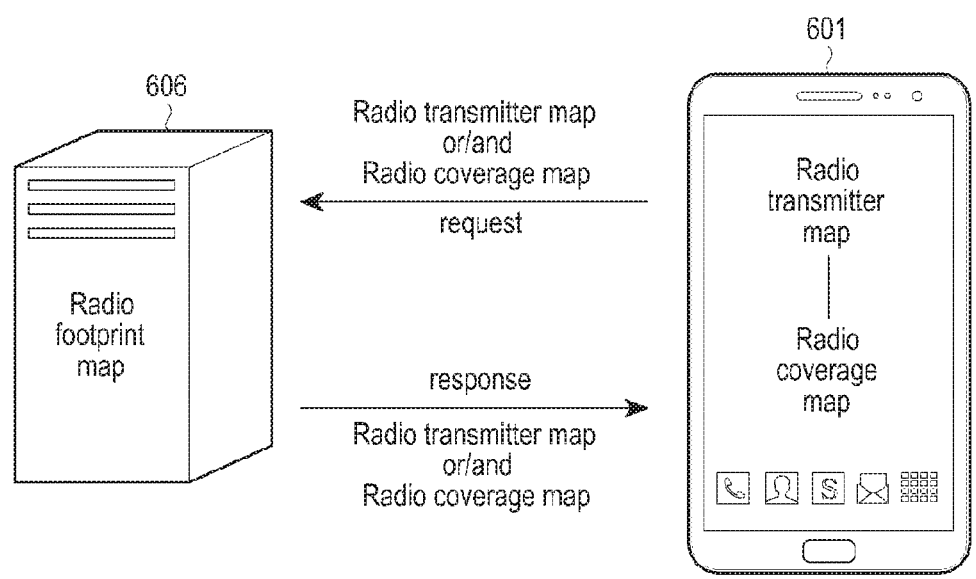
FIG. 6 is a diagram illustrating an example of requesting and responding for a radio map between an electronic device and a server, according to an embodiment of the present disclosure.

FIG. 6 is a diagram illustrating an example of requesting and responding for a radio map between an electronic device 601 and a server, according to an embodiment of the present disclosure.

Referring to FIG. 6, the electronic device 601, upon reception of transmitting end information from at least one transmitting end, may send a request for a radio map corresponding to the received transmitting end information to a server 606. At least one or more electronic devices 601 may be present. The server 606 may collect data in a crowd sourcing fashion and accrue statistical data. Upon reception of the request for the radio map corresponding to the transmitting end information received by the electronic device 601, the server 606 may transmit a response containing the radio map corresponding to the transmitting end information to the electronic device 601 in response to the request. According to an embodiment of the present disclosure, the server 606 may immediately send the response to the electronic device 601 in response to the request from the electronic device 601. According to an embodiment of the present disclosure, the server 606 may periodically send the response to the electronic device 601 in response to the request from the electronic device 601.

According to an embodiment of the present disclosure, the radio coverage map may be stored, with the serving cell and neighbor cell areas for at least one transmitting end formed in parameters. For example, as a key value specifying a cell of the network information of the transmitting end, identification information, such as a GCI or PCI, may be contained. For example, the GCI may correspond to a LTE E-URRAN cell identifier or a WCDMA or GSM cell identifier, and the PCI may correspond to a LTE physical cell identifier, a WCDMA primary scrambling code, or a GSM base station identity code. For example, for the serving cell, the transmitting end information may contain at least one of the GCI information and PCI information, and for the neighbor cell, the transmitting end information may contain PCI information.

According to an embodiment of the present disclosure, the radio coverage map, if the cell is the serving cell, may include a list of neighbor cells and a list of pieces of coverage area information (e.g., full coverage information) as per a combination of the neighbor cells. Because the full coverage information is required to store for all possible combinations of the neighbor cells and the serving cell for at least one transmitting end, its database may be increased. Hence, a more simplified cell structure may be needed given the database capacity. For example, two types of information (e.g., dual-coverage information) may be stored: coverage information (e.g., inner coverage) where the corresponding transmitting end is the serving cell; and coverage information (e.g., outer coverage) where the transmitting end is a neighbor cell.

Figure 7A:
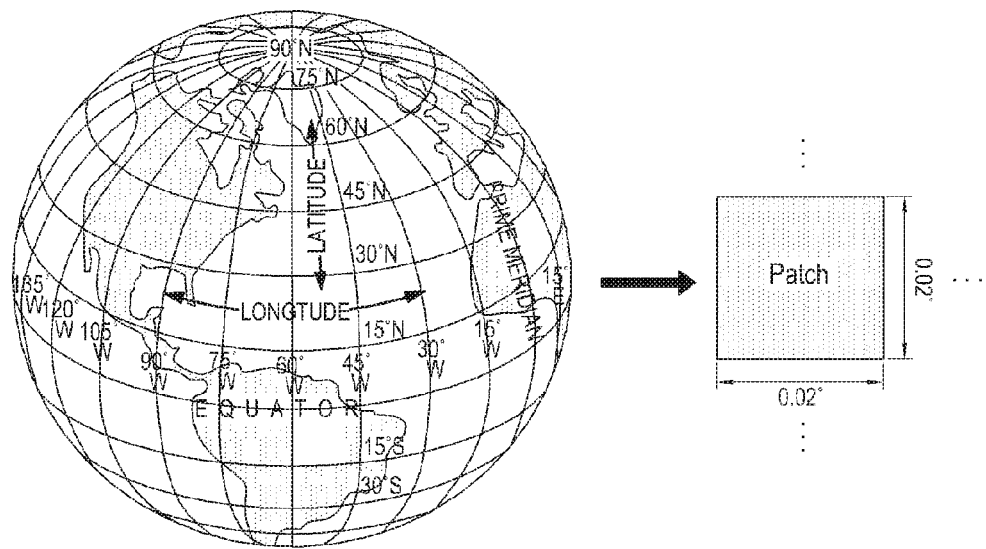
FIGS. 7A and 7B are diagram s illustrating, as examples, the concept of a patch that is a unit used in storing a radio map, according to an embodiment of the present disclosure.
Figure 7B:
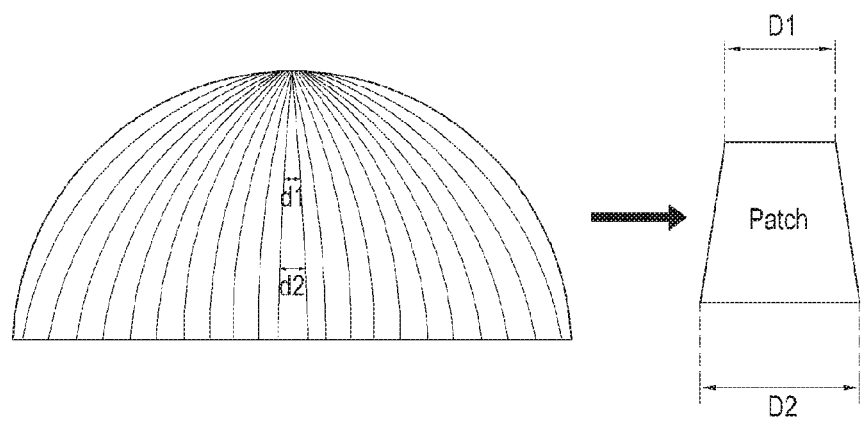

FIGS. 7A and 7B are diagram s illustrating, as examples, the concept of a patch that is a unit used in storing a radio map, according to an embodiment of the present disclosure.

Referring to FIG. 7A, myriad cells may be present on earth. Information necessary for any one electronic device to position the electronic device may be limited to a partial area around a user's position. For effective access and control by the electronic device and server, a basic unit for management of information (database (DB)) constituted of cells in a predetermined area may be required, herein defined as a patch. As shown in FIG. 7a, a patch is a lump of cells included in a trapezoid created by the latitudinal and longitudinal lines on earth and may be defined as the basic unit of information). Such patch information may be geographically differentiated as latitudinal indexes (latIndex) and longitudinal indexes (longIndex). Further, for the patch, various databases may be present per country, service provider, or frequency even in the same area. Thus, the patch information may be stored distinctly per country, communication service provider, or frequency band according to the user's need. For example, the MCC may be used to distinguish among countries, the MNC to distinguish among communication service providers, and the frequency channel number (FCN) to distinguish among frequency bands. The FCN may correspond to the EARFCN of LTE, the utra ARFCN (UARFCN) of WCDMA, and the ARFCN of GSM. The server may manage the overall database information per patch. The electronic device may request and receive part of the information from the server and store and manage the same distinctively in multiple storage spaces of the electronic device depending on its importance.

Referring to FIG. 7B, the size of the patch, i.e., the longitudinal length, may be varied depending on a latitude. For example, the latitude and longitude are defined in degrees from the center of the earth, and since the earth is spherical in shape, the longitudinal length corresponding to the horizontal length of the actual patch is varied depending on the latitude (D1<D2), and the longitude shortens as the latitude increases (d1<d2). For example, the length [km] of the longitude as per the latitude of the patch differentiated per 0.02 degrees may be calculated as shown in Table 2 below.

TABLE 2

| Latitude [°] | Length of longitude [km] |
|---|---|
| 0 | 2.42 |
| 5 | 2.4 |
| 10 | 2.38 |
| 15 | 2.34 |
| 20 | 2.28 |
| 25 | 2 |
| 30 | 1.92 |
| 35 | 1.82 |
| 40 | 1.7 |
| 45 | 1.56 |
| 50 | 1.42 |
| 55 | 1.26 |
| 60 | 1.1 |
| 65 | 0.94 |
| 70 | 0.76 |
| 75 | 0.56 |
| 80 | 0.38 |
| 75 | 0.18 |
| 90 | 0 |

As set forth in Table 2 above, the length of the longitude decreases as the latitude increases; as the latitude increases, the patch shrinks. The size of the patch may be used to determine a search scope upon searching for the patch stored in the database, as described below. For example, since the patch reduces in sizes as the latitude increases, the number of tiers of neighbor patches surrounding the reference patch may increase, meaning that more search scopes can be present.

Figure 8A:
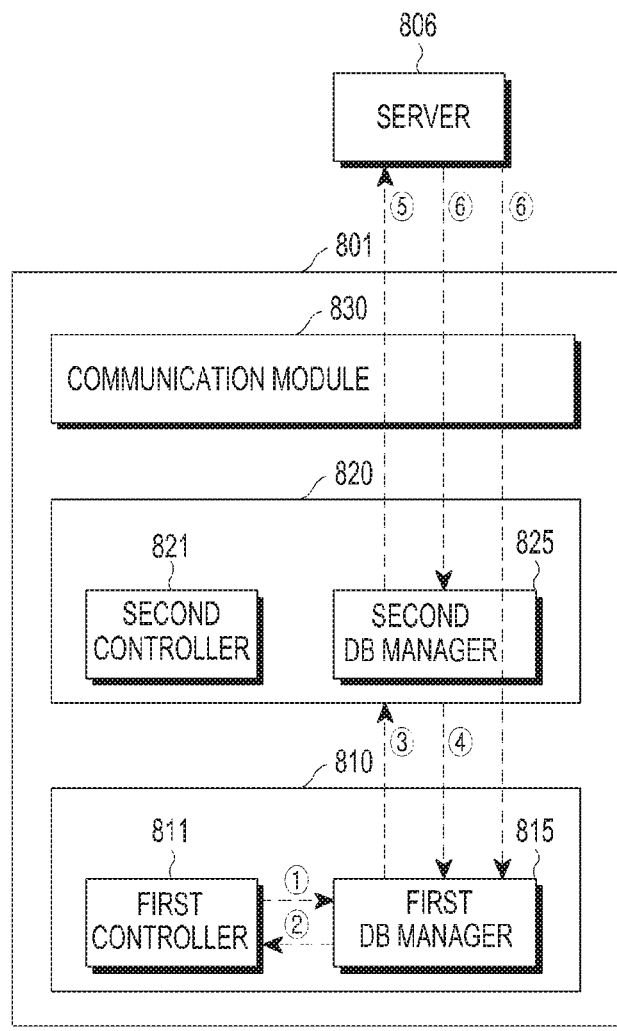
FIG. 8A is a diagram illustrating an example signal flow as per requesting and responding for a radio map between an electronic device and a server, according to an embodiment of the present disclosure.

FIG. 8A is a diagram illustrating an example signal flow as per requesting and responding for a radio map between an electronic device 801 and a server, according to an embodiment of the present disclosure.

Referring to FIG. 8A, an electronic device 801 may include at least one of a first processor (e.g., a communication processor (CP) 810), a second processor (e.g., an application processor (AP) 820, or a communication module 830. The electronic device 801 may include all or part of the components of the electronic device 101.

The first processor 810, when the electronic device 801 receives transmitting end information from at least one transmitting end, may search for a radio map corresponding to the received transmitting end information and position the electronic device 801 using the searched radio map. For example, when the transmitting end information is received, a first controller 811 of the first processor 810 may send a request (e.g., a first request signal ①) for a radio map corresponding to the received information to a first database (DB) manager 815.

Based on the radio map request (first request signal ①), the first DB manager 815 may perform control so that the radio map corresponding to the received transmitting end information may be searched and stored in predetermined descending order of search and storage priority in a plurality of databases having different search and storage priorities in the memory of the first processor 810. The first DB manager 815, if at least part of at least one radio map corresponding to the received transmitting end information is searched from the memory of the first processor 810, may transmit a response (e.g., a first response signal ②) containing the searched, at least, part of the at least one radio map to the first controller 811.

The first DB manager 815, unless at least part of at least one radio map corresponding to the received transmitting end information is searched from the memory of the first processor 810, may send a request (e.g., a second request signal ③) for the at least part of the at least one radio map not searched from the memory of the first processor 810 to a higher process, to the second process 820 (e.g., a second DB manager 825).

Based on the radio map request (second request signal ③), the second DB manager 825 of the second processor 820 may perform control so that the at least part of the at least one radio map not searched from the memory of the first processor 810 may be searched from at least one database in the memory of the second processor 820.

When the at least part of the at least one radio map not searched from the memory of the first processor 810 is searched from the memory of the second processor 820, the second DB manager 825 may transmit, to the first processor 810 (e.g., the first DB manager 815), a response (e.g., a second response signal ④) containing the searched, at least, part of the at least one radio map.

Unless the at least part of the at least one radio map not searched from the memory of the first processor 810 is searched from the memory of the second processor 820, the second DB manager 825 may send a request (e.g., a third request signal ⑤) for the at least part of the at least one radio map not searched from the memory of the second processor 820 to a higher device, a server 806, through the communication module 830.

Based on the radio map request (third request signal ⑤), the server 806 may perform control so that the at least part of the at least one radio map not searched from the memory of the second processor 820 may be searched from the memory of the server 806. The server 806 may transmit (e.g., in a third response signal ⑥) the at least part of the at least one radio map not searched from the memory of the second processor 820, which is searched from the memory of the server 806, to the second processor 820 (e.g., the second DB manager 825) or the first processor 810 (e.g., the first DB manager 815) through the communication module 830.

The second DB manager 825 may receive (through the third response signal ⑥), from the server 806, the at least part of the at least one radio map not searched from the memory of the second processor 820, which is responsive to the radio map request (third request signal ⑤) and may store the same in the memory of the second processor 820. Further, the second DB manager 825 may extract the information corresponding to the radio map request (second request signal ③) sent from the first processor 810 based on the information received from the server 806 and may transmit the extracted information to the first processor 810. The first DB manager 815 may store, in the memory of the first processor 810, the extracted, at least, one radio map transmitted from the second DB manager 825.

According to an embodiment of the present disclosure, the first processor 810 and the second processor 820 may connect to each other via inter-processor communication (IPC) and may transfer communications (e.g., control messages or data) therebetween.

The communication module 830 may perform communication between the electronic device 801 and the server 806. The communication module 830 may have all or part of the components of the communication interface 170 of FIG. 1.

Although, in FIG. 8A, the first controller 811 and first DB manager 815 of the first processor 810 are shown as separate modules, embodiments of the present disclosure are not limited. The first controller 811 and the first DB manager 815 may be configured in a single module. Likewise, although the second controller 821 and the second DB manager 825 are shown as separate modules, the second controller 821 and the second DB manager 825 may be constituted in a single module.

As shown in FIG. 8A, the electronic device 810, when the first processor 810 receives the transmitting end information from at least one transmitting end for positioning the electronic device 806, may search by sending requests for at least one radio map corresponding to the received transmitting end information in order of different priorities, e.g., in the order of the memory of the first processor 810, the memory of the second processor 820, and the server 806. For example, a priority for the request and search may be set to increase from the memory of a lower processor or device to the memory of a higher processor or device. Conversely, the priority of storage of the at least one radio map corresponding to the received transmitting end information responsive to the request may be set to increase from the memory of the higher processor or device to the memory of the lower processor or device, so as to subject the radio map to distributive storage. For example, the second processor 820 may process more data and computational load than the first processor 810. The memory capacity of the second processor 820 may be relatively large compared to that of the first processor 810. The second processor 820 may store more radio maps including the radio map stored in the memory of the first processor 810. Therefore, it is assumed herein that the first processor 810 is a lower processor, and the second processor 820 is a higher processor. It is also assumed that the server 806, as a device for storing all radio maps necessary for the electronic device 810 to estimate its location, is a higher device, and the electronic device 801 is a lower device.

According to an embodiment of the present disclosure, upon sending a request (e.g., the second request signal ③) for at least one radio map from the first processor 810 to the second processor 820, the second processor 820 may immediately search for the at least one radio map responsive to the request. Further, according to an embodiment of the present disclosure, the second processor 820 may switch from a lower-power state to a normal state periodically or whenever requested by the user or the first processor. When the second processor wakes up to operate, the electronic device may consume more power. In order to reduce this power consumption of the second processor 820, the first processor 810 may temporarily store the generated request (e.g., the second request signal ③) for the at least one radio map in the buffer of the first processor 810, and when the second processor 820 switches into the normal state, the first processor 810 may transmit the request to the second processor 820.

Figure 8B:
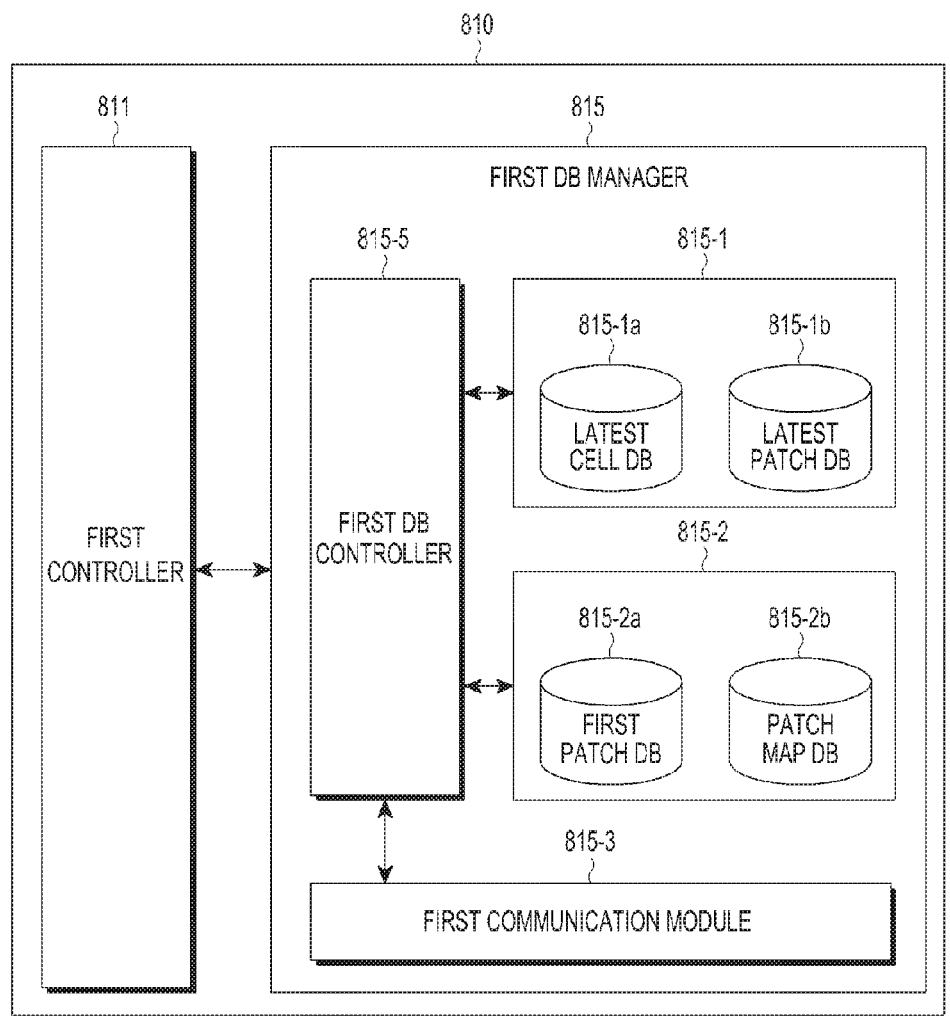
FIG. 8B is a block diagram illustrating a first processor of an electronic device, according to an embodiment of the present disclosure.

FIG. 8B is a block diagram illustrating a first processor of an electronic device, according to an embodiment of the present disclosure.

Referring to FIG. 8B, a first processor 810 may include a first controller 811 and a DB manager 815. The first DB manager 815 may include a first memory 815-1, a second memory 815-2, a first communication module 815-3, and a first DB controller 815-5.

The first controller 811 may estimate the location of the electronic device 801. The first controller 811 may include a predetermined positioning module (e.g., a trajectory tracking module) to calculate the location of the electronic device 801. The first controller 811, upon receiving transmitting end information from at least one transmitting end, may send a request for at least part of at least one radio map corresponding to the received transmitting end information to at least one of the first processor 810, the second processor 820, or a server 806 and receive the same. The first controller 811 may calculate the location of the electronic device 801 based on the received at least one radio map.

According to an embodiment of the present disclosure, the first controller 811 may send a first request for the at least part of the at least one radio map corresponding to the received transmitting end information to the first DB controller 815-5 of the first DB manager 815, for example. Based on the first request, the first DB controller 815-5 may search for the at least part of the at least one radio map corresponding to the received transmitting end information in the first memory 815-1. For example, the first memory 815-1 may include at least one of a first database (e.g., a latest cell DB) 815-1*a* or a second database (e.g., a latest patch DB) 815-1*b*. According to an embodiment of the present disclosure, the first database 815-1*a* may be a database that has stored cell information of at least one radio map corresponding to the information about the transmitting end accessed latest, and the second database 815-1*b* may be a database that stores patch information of the at least one radio map corresponding to the information about the transmitting end accessed latest. When information more than a limited capacity of information is inputted, the first and second database 815-1*a* and 815-1*b* may first leave the information about the position close to the user for which calculation has been made, deleting the remaining information. For example, such deletion may be performed in chronological order from oldest cell information or patch to new.

According to an embodiment of the present disclosure, the first request (the first request signal ① of FIG. 8A) may contain a first cell information request (cell info query) structure. The first cell information request structure is described below in greater detail with reference to FIG. 9.

According to an embodiment of the present disclosure, the cell information request structure contained in the first request may include first network information containing a key value indicating the first request, first identification information regarding the corresponding transmitting end, and first measurement information obtained at the corresponding transmitting end.

According to an embodiment of the present disclosure, the first network information may include information about at least one of an MCC, an MNC, an RAT, or an FCN.

According to an embodiment of the present disclosure, the first identification information may include information about at least one of a GCI or a PCI.

According to an embodiment of the present disclosure, the first measurement information may include information about at least one of an RSSI, an RSRP, an RSRQ, an RSCP, an SNR, or a TA.

The first DB controller 815-5, upon searching for the at least one radio map corresponding to the first request in the first memory 815-1, may determine whether the first memory 815-1 includes a radio map complying with at least one of the MCC or the MNC of the network information contained in the first request, and if present, determine whether there is a radio map complying with at least one of the RAT or FCN of the network information contained in the first request, and if present, determine whether the identification information contained in the first request is consistent. For example, regarding the first identification information, it can be determined for the serving cell whether the information about the GCI is consistent, and it can be determined for the neighbor cell whether the information about the PCI is consistent, so that the radio map consistent with that for the cell request information structure contained in the first request in the first memory 815-1 may be determined to be the radio map corresponding to the first request. The first DB controller 815-5, when at least part of the at least one radio map corresponding to the first request is searched in the first memory 815-1, may receive the same from the first memory 815-1.

Unless the at least part of the at least one radio map corresponding to the first request is searched in the first memory 815-1, i.e., if no at least part of the at least one radio map consistent with the cell request information structure contained in the first request is searched, the first DB controller 815-1 may perform control so that the at least one radio map corresponding to the first request is searched in the second memory 815-2 storing more information of radio maps than those of the first memory 815-1. As a searching method, the same method that has been described above in connection with the first memory 815-1 may be performed. Also, the second memory 815-2 may include at least one of, e.g., a third database (e.g., a patch DB) 815-2a or a fourth database (e.g., a patch map DB) 815-2b.

According to an embodiment of the present disclosure, the third database may be a database storing patch information about at least one radio map corresponding to the information about the transmitting end previously accessed by the electronic device 801, and the first database 815-1a and the second database 810-1b may some cell information or patch information extracted from the third database 815-2a.

According to an embodiment of the present disclosure, the fourth database 815-2b may be a database storing information of a patch map structure reconfigured in the form in which neighbor patch information surrounds reference patch information that is the patch information of the third database 815-2a. The fourth database 815-2b may enable an efficient search for the at least one radio map corresponding to the first request as compared with the third database 815-2a. The patch map structure is described below in greater detail with reference to FIGS. 12A and 12B.

According to an embodiment of the present disclosure, when the at least part of the at least one radio map corresponding to the first request is searched in the second memory 815-2, the first DB controller 815-5 may receive the same from the second memory 815-2 in a response (e.g., the first response signal ② of FIG. 8a) to the first request.

When the at least part of the at least one radio map corresponding to the first request is not searched in the second memory 815-2 (that is, unless at least part of the radio map consistent with the cell request information structure contained in the first request is searched), the first DB controller 815-5 may send a second request (e.g., the second request signal ③) for the at least part of the at least one radio map not searched through the first communication module 815-3 to a higher processor (e.g., the second processor 720) storing more information of radio maps than the second memory 815-2. Although, in FIG. 8B, each component 811 to 815 of the first processor 810 is as a separate module, some of the components 811 to 815 may be integrated or all of the components may be integrated into a single module.

According to an embodiment of the present disclosure, the first processor 810 may switch from a lower-power state to a normal state periodically (e.g., discontinuous reception (DRX) periods). The first controller 811 may be operated when the first processor 810 is in the normal state. The first controller 811 may be operated when the first processor 810 is in a designated number of times of the normal state as per a designated rule. This includes, e.g., each switch into the normal state, each odd-numbered switch into the normal state, or each switch into the normal state considered by the first controller 811 to be required to be done so. The operational state of the first processor 810 is described below in further detail with reference to FIG. 8C.

Figure 8C:
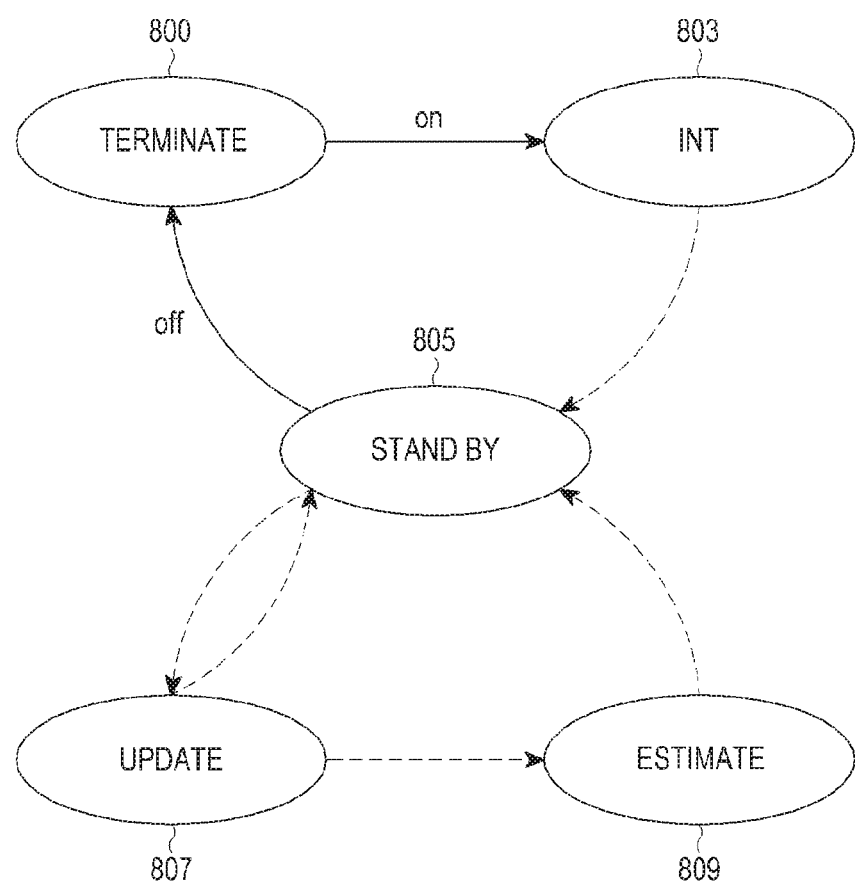
FIG. 8C is a diagram illustrating an operational state of an electronic device, according to an embodiment of the present disclosure.

FIG. 8C is a diagram illustrating an operational state of an electronic device, according to an embodiment of the present disclosure.

Referring to FIG. 8C, the first controller 811 switches from a termination state (TERMINATE) 800 to an initialization state (INIT) 803 when it powers on, initializing various variables and timer. The first controller 811, upon completion of the initialization, may switch into a standby state (STAND BY) 805. In the standby state 805, it sets up, e.g., the timer expires, to store transmitting end information received for the set time. When the set time expires, the first controller 811 switches into an update state (UPDATE) 807 to update the radio map corresponding to the received transmitting end information. For example, in the update state 807, the first controller 811 may request and receive at least one radio map corresponding to the transmitting end information received for the set time and store and update the at least one radio map received in a corresponding memory according to storage priority.

When the first controller 811 fails to obtain the radio map corresponding to the transmitting end information in the update state 807, the first controller 811 may switch into the standby state 805. When the first controller 811 obtains at least one radio map corresponding to the transmitting end information in the update state 807, it may switch into a location estimation state (ESTIMATE) 809 for calculating the location of the electronic device 801.

In the location estimation state (ESTIMATE) 809, the location of the electronic device 801 may be calculated using the at least one radio map updated corresponding to the transmitting end information received at each set time. The calculated location of the electronic device 801 may be subject to a large variation due to, e.g., fading. Accordingly, in the location estimation state 809, the first controller 811 may perform a smoothing process for smoothing the moving trajectory for the imminent location calculated in the update state 807 using previous location and speed information. By running through the smoothing process, the location of the electronic device 801 may finally be estimated. After estimating the location of the electronic device 801 in the location estimation state 809, the first controller 811 may switch back into the standby state 805.

The first controller 811 may recursively repeat from the standby state 805 to the update state 807 or the location estimation state 809 at every set time. Further, upon power-off, the first controller 811 may switch from the standby state 805 to the termination state 800. The solid line in FIG. 8C denotes a state switch that occurs once only when the electronic device 801 powers on or off. For example, when the electronic device 801 powers on, the first controller 811 may switch once from the termination state 800 to the initialization state 803, and when the electronic device 801 powers off, the first controller 811 may switch once from the standby state 805 to the termination state 800. A state switch may arise, as per the set time, between the standby state 803, the update state 807, and the location estimation state 809.

Figure 8D:
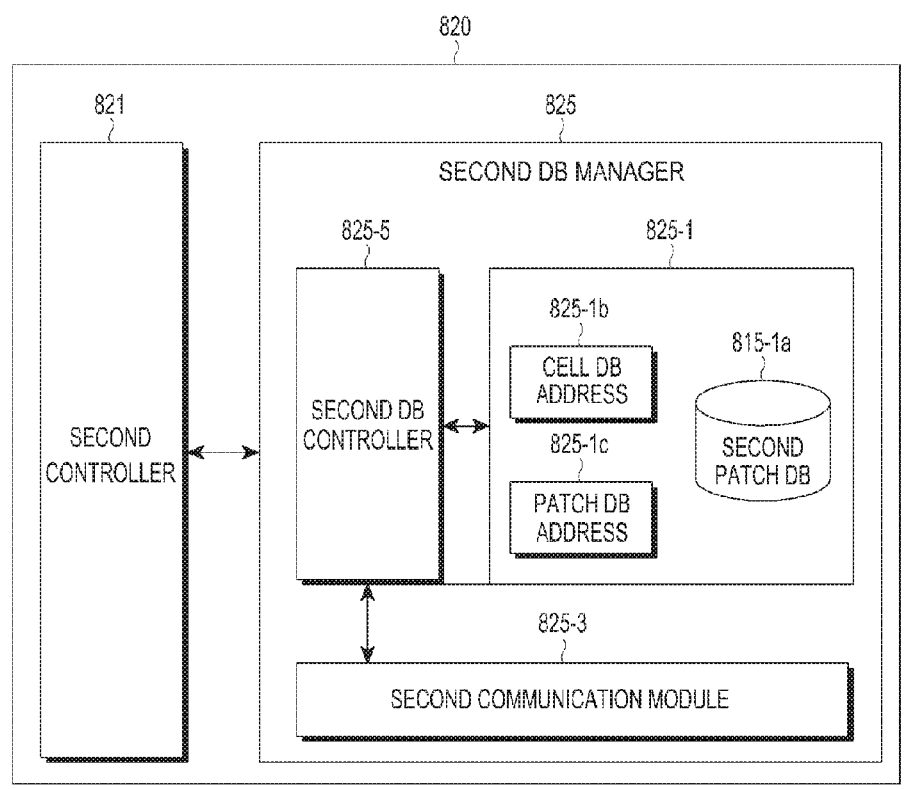
FIG. 8D is a block diagram illustrating a second processor of an electronic device, according to an embodiment of the present disclosure.

FIG. 8D is a block diagram illustrating a second processor of an electronic device, according to an embodiment of the present disclosure.

Referring to FIG. 8D, the second processor 820 may include a second controller 821 and a second DB manager 825. The second DB manager 825 may include a third memory 825-1, a second communication module 825-3, and a second DB controller 825-5.

The second controller 821 may receive the second request (e.g., the second request signal ③ of FIG. 8A) from the first processor (e.g., the communication module 815-3) and transfer the same to the second DB controller 825-5 of the second DB manager 825. Based on the second request, the second DB controller 825-5 may search the third memory 825-1 for at least part of the at least one radio map not searched in the first processor 810 of at least radio map corresponding to the received transmitting end information. For example, the third memory 825-1 may include a fifth database 825-1a. The fifth database 825-1a may include more patch information than the third database 815-2a of the first processor 810. Further, the third memory 825-1 may further include at least one of a patch DB address storage unit 825-1c or a cell DB address storage unit 825-1b storing, in a list or table form, the cell DB address storing the cell information for search or the patch DB address storing the patch information. The second DB controller 825-5 may easily search the fifth database 825-1a for the at least part of the at least one radio map not searched in the first processor 810 of at least one radio map corresponding to the received transmitting end information using the cell DB address or patch DB stored in the cell DB address storage unit 825-1b or patch DB address storage unit 825-1c.

According to an embodiment of the present disclosure, the second request (the second request signal ③ of FIG. 8A) may include a second cell information request (cell info request) structure. The second cell information request structure is described below in greater detail with reference to FIGS. 10A and 10B.

When the at least part of the at least one radio map corresponding to the second request is not searched in the third memory 825-1 (that is, unless at least part of the radio map consistent with the second cell request information structure contained in the second request is searched), the second DB controller 825-5 may send a third request (e.g., the third request signal ⑤ of FIG. 8A) for the at least part of the at least one radio map not searched through the second communication module 825-3 to a higher processor (e.g., the server 806) storing more information of radio maps than the third memory 825-1.

The server 806 may receive the third request from the second processor (e.g., the second communication module 825-3) and may send the at least one radio map to the second processor 820 in response (e.g., the third response signal ⑥ of FIG. 8a) thereto. The server 806 may have the cloud functionality of, e.g., a computer system, and may store radio maps for all transmitting ends.

According to an embodiment of the present disclosure, the third request may include a third cell information request (cell info request) structure. The third cell information request structure is described below in greater detail with reference to FIGS. 11A and 11B.

Although, in FIG. 8D, each component 821 to 825 of the second processor 820 is shown as a separate module, some of the components 821 to 825 may be integrated, or all of the components may be integrated into a single module.

Figure 9:
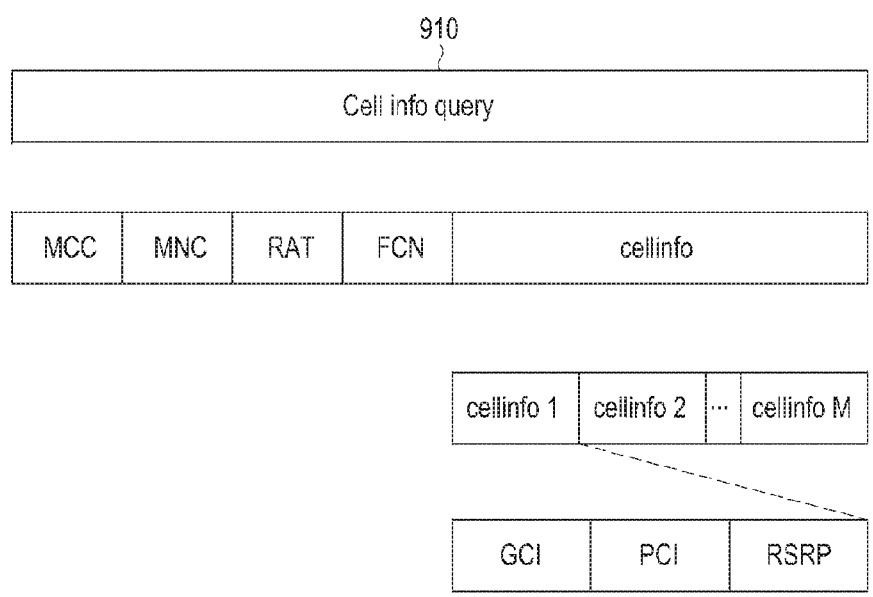
FIG. 9 is a diagram illustrating an example of a cell information requesting structure of an electronic device, according to an embodiment of the present disclosure.

FIG. 9 is a diagram illustrating an example of a cell information requesting structure of an electronic device, according to an embodiment of the present disclosure.

Referring to FIG. 9, the first cell information request structure 910 contained in the first request (the first request signal ① of FIG. 8A) may include first network information containing a key value indicating the first request, first identification information about the corresponding transmitting end, and first measurement information obtained at the transmitting end.

According to an embodiment of the present disclosure, the first network information may include information about at least one of an MCC, an MNC, an RAT, or an FCN.

According to an embodiment of the present disclosure, the first identification information may include information about at least one of a GCI or a PCI.

According to an embodiment of the present disclosure, the first measurement information may include information about at least one of an RSSI, an RSRP, an RSRQ, an RSCP, an SNR, or a TA. For example, cellinfo 1 may contain information about the serving cell, and for the serving cell, the first cell information may contain all of the information about the GCI and PCI. For example, cellinfo2 to cellinfo M may contain information about at least one neighbor cell, and for the neighbor cell, the first cell information may have only the information about the PCI, with the field corresponding to the GCI left empty.

Figure 10A:
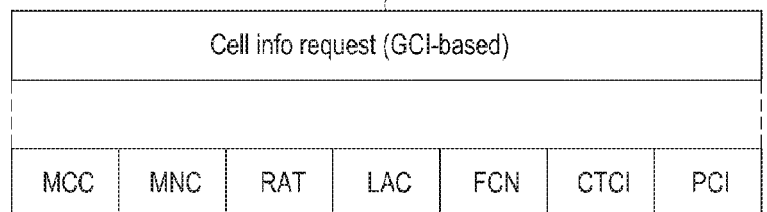
FIGS. 10A and 10B are diagrams s illustrating an example cell information requesting structures of an electronic device, according to an embodiment of the present disclosure.
Figure 10B:
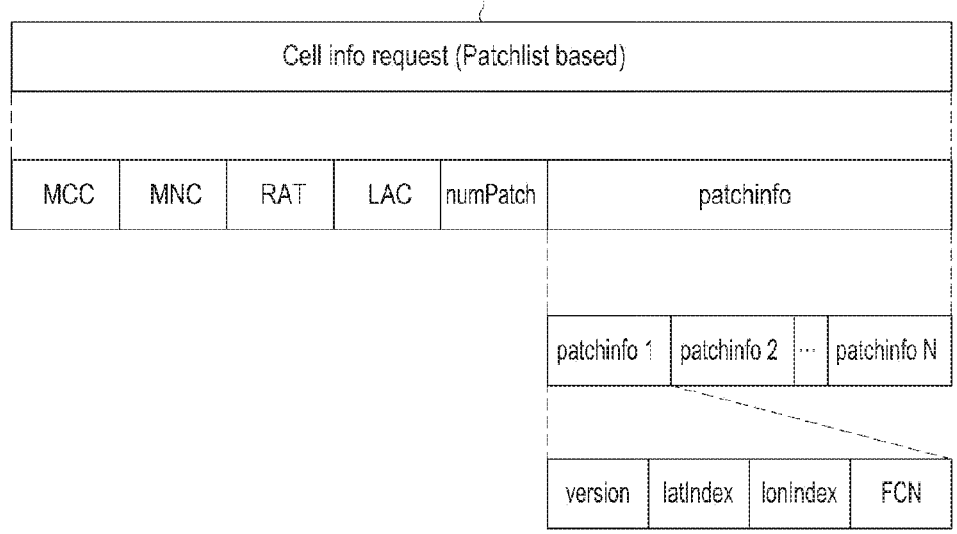

FIGS. 10A and 10B are diagrams illustrating an example cell information requesting structures of an electronic device, according to an embodiment of the present disclosure.

Referring to FIGS. 10A and 10B, the first processor 810 of the electronic device 801 can send the second request (the second request signal ③ of FIG. 8A) to the second processor 820 using two methods.

According to an embodiment of the present disclosure, upon search for at least part of the at least one radio map corresponding to the received transmitting end information based on the first request (the first request signal ① of FIG. 8A) sent from the first controller 811 of the first processor 810, unless the radio map consistent with the serving cell is searched in at least one of the memories (e.g., the first memory 815-1 or the second memory 815-2) of the first processor 810, the second request may include the CGI-based second cell information request structure 1000a as shown in FIG. 10A.

According to an embodiment of the present disclosure, when information about the previous location of the user is present, the patch corresponding to the previous location of the electronic device 801 may be set as a reference patch, and neighbor patches surrounding the reference patch may be searched in the second memory 815-2 of the electronic device 801. When at least patch corresponding to the transmitting end information is not searched in the second memory 815-2 upon searching for the neighbor patches in the first processor 810, the second request may contain the patch list-based second cell information request structure 1000b as shown in FIG. 10B.

Referring to FIG. 10A, the GCI-based second cell information request structure 1000a may include information about at least one of an MCC, an MNC, an RAT, a location area code (LAC), a GCI, a PCI, or an FCN.

Referring to FIG. 10B, the patch list-based second cell information request structure 1000b may contain second network information containing a key value indicating the second request and first patch information corresponding to the transmitting end.

According to an embodiment of the present disclosure, the second network information may contain information about at least one of an MCC, an MNC, an RAT, an LAC, or the number (numPatch) of patches.

According to an embodiment of the present disclosure, the first patch information may include information about at least one of the version, latitude, longitude, or FCN of each patch.

The second DB controller 825-5 of the second processor 820 of the electronic device 801 may determine the number of tiers of neighbor patches surrounding the reference patch upon searching for neighbor patches for the reference patch. A method for determining a search scope when the second DB controller 825-5 searches for neighbor patches for the reference patch is described below in greater detail with reference to FIGS. 13A to 13C.

Figure 11A:
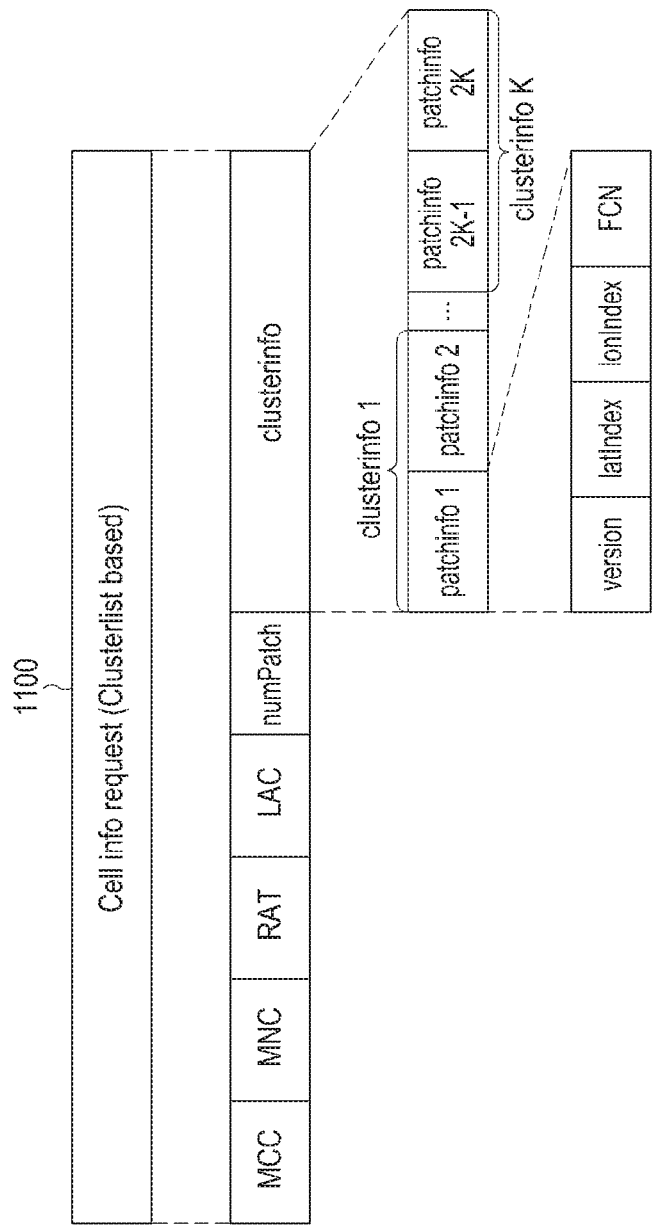
FIG. 11A is a diagram illustrating an example of a cell information requesting structure of an electronic device, according to an embodiment of the present disclosure.
Figure 11B:
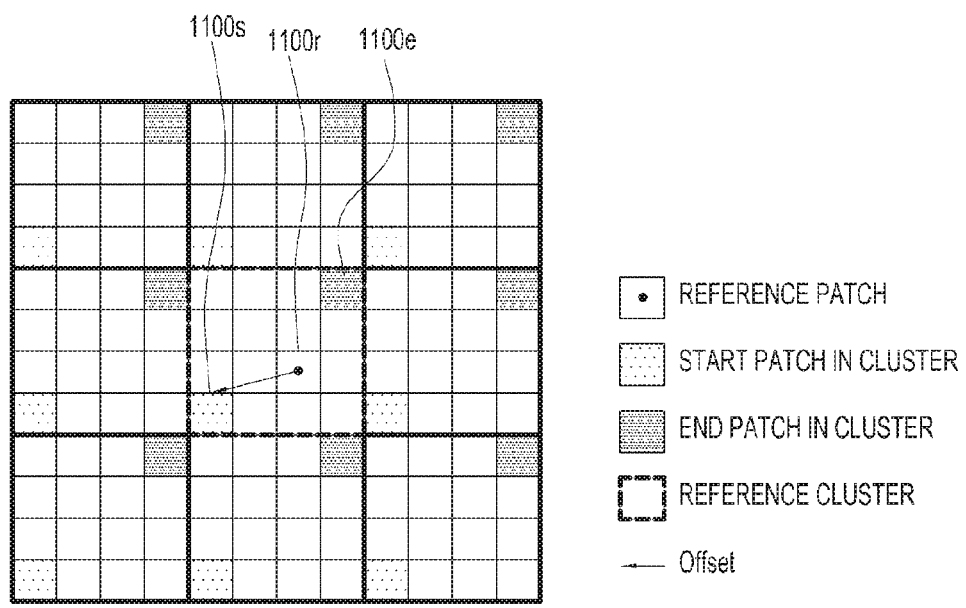
FIG. 11B is a diagram illustrating a data architecture for describing the concept of a cluster of a cell information requesting structure of an electronic device, according to an embodiment of the present disclosure.

FIG. 11A is a diagram illustrating an example of a cell information requesting structure of an electronic device, according to an embodiment of the present disclosure. FIG. 11B is a diagram illustrating a data architecture for describing the concept of a cluster of a cell information requesting structure of an electronic device, according to an embodiment of the present disclosure.

Referring to FIG. 11A, the cell information request structure 1100 contained in the third request may include at least one of third network information containing a key value indicating the third request (the third request signal ⑤ of FIG. 8A), second patch information containing at least part of the first patch information corresponding to the transmitting end, or cluster information containing at least part of the second patch information. One piece of cluster information may include two pieces of patch information (e.g., start patch information and end patch information of the cluster) as shown in FIG. 11B.

Referring to FIG. 11B, the cluster may include a plurality of patches. For example, in one cluster, a start patch 1100s and end patch 1100e shifted by a predetermined offset from the reference patch 1100r may be used as identifiers of the cluster. For example, a cluster containing a plurality of patches may be defined with information about two patches, e.g., the start patch and end patch. The second DB controller 825-5 of the second processor 820 in the electronic device 801 may set the number of tiers of neighbor clusters surrounding the reference cluster with respect to the reference cluster containing the reference patch so defined.

Although FIG. 11B illustrates one tier of neighbor clusters surrounding the reference cluster, embodiments of the present disclosure are not limited thereto, and more tiers of neighbor clusters may also be requested.

According to an embodiment of the present disclosure, the third network information may contain information about at least one of an MCC, an MNC, an RAT, an LAC, or the number of patches.

According to an embodiment of the present disclosure, the cluster information may include at least one of second patch information containing at least part of the first patch information or cluster information containing at least part of the second patch information. Referring again to FIG. 11A, when the third request includes the cluster list-based third cell information request structure 1100, upon sending a request for K pieces of cluster information to the server 806, two pieces of patch information may be required. Two pieces of patch information containing the start patch information and end patch information per cluster may be included in the third request.

Figure 12A:
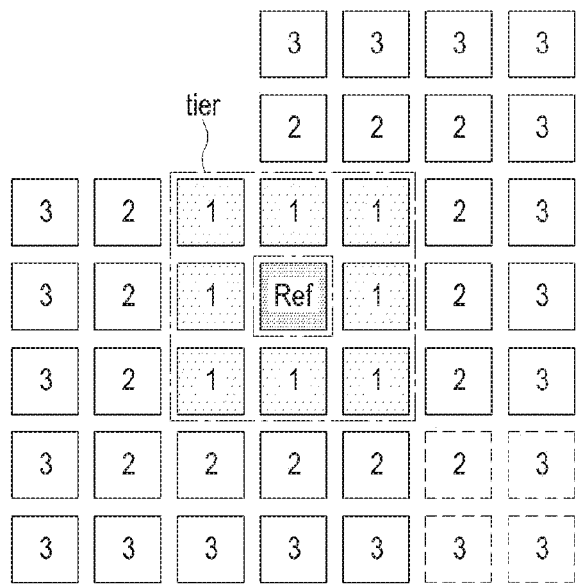
FIG. 12A is a diagram illustrating an example for describing a method for determining a search scope upon searching for a radio map corresponding to transmitting end information in a memory of an electronic device, according to an embodiment of the present disclosure.
Figure 12B:
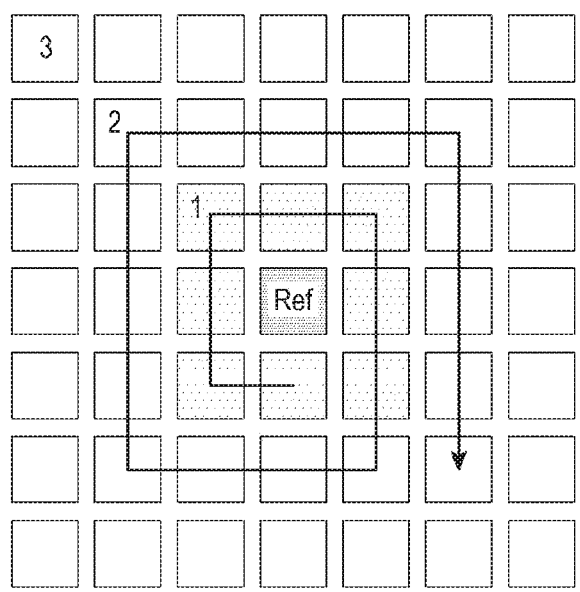
FIG. 12B is a diagram illustrating an example for describing a search order upon searching for a radio map corresponding to transmitting end information in a memory of an electronic device, according to an embodiment of the present disclosure.

FIG. 12A is a diagram illustrating an example for describing a method for determining a search scope upon searching for a radio map corresponding to transmitting end information in a memory of an electronic device, according to an embodiment of the present disclosure. FIG. 12B is a diagram illustrating an example for describing a search order upon searching for a radio map corresponding to transmitting end information in a memory of an electronic device, according to an embodiment of the present disclosure.

Referring to FIG. 12A, the electronic device 801 may search at least one of the first memory 815-1 and second memory 815-2 of the first processor 810, the third memory 825-1 of the second processor 820, or the server 806 for the at least part of the at least one radio map corresponding to the received transmitting end information according to the first to third requests. Upon searching for the radio map, if the previous location of the electronic device 801 is recognized, it may be more efficient to search for the radio map information corresponding to the transmitting end information currently received with respect to the previous location. Therefore, the electronic device 801 may define the previous location of the electronic device 801 as a reference (ref) patch and neighbor patches surrounding the ref patch as a tier. The search scope may be determined by setting the number of tiers of neighbor patches.

According to an embodiment of the present disclosure, the electronic device 801 may determine a search scope for the at least one radio map based on at least one of the previous location information and movement speed of the electronic device 801 or the density (e.g., coverage size of the transmitting end) of the at least one transmitting end. For example, as the latitude of the area where the electronic device 701 is situated, the movement speed of the electronic device 801, or the coverage size of each transmitting end increase, more tiers of patches need to be searched for, and thus, the number of tiers may increase. Further, since, as the density of at least one transmitting end increases, the coverage of each transmitting end may be rendered smaller, the number of tiers may decrease.

When the search scope is determined, the electronic device 801 may search for a corresponding patch in predetermined order of search as shown in FIG. 12B. For example, the order of search may be determined to search for the corresponding patch in a spiral direction from one tier of patches positioned below the ref patch.

As such, the efficiency of search for at least one radio map corresponding to the received transmitting end information may be enhanced by the order of search and determination of the number of tiers from the neighbor patch closest to the reference patch.

Figure 13A:
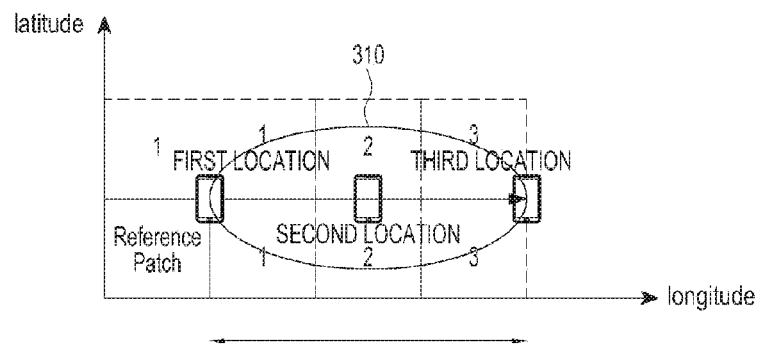
FIGS. 13A to 13C are diagrams illustrating examples for describing a method for determining a search scope upon searching for a radio map corresponding to transmitting end information in a memory of an electronic device, according to an embodiment of the present disclosure.
Figure 13B:
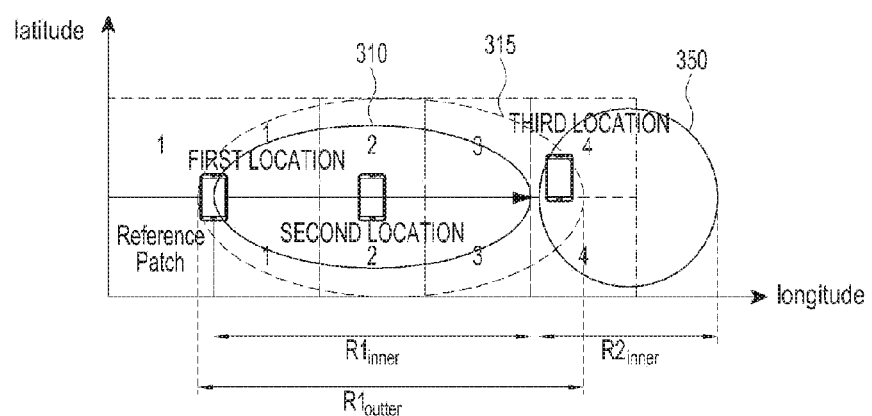
Figure 13C:
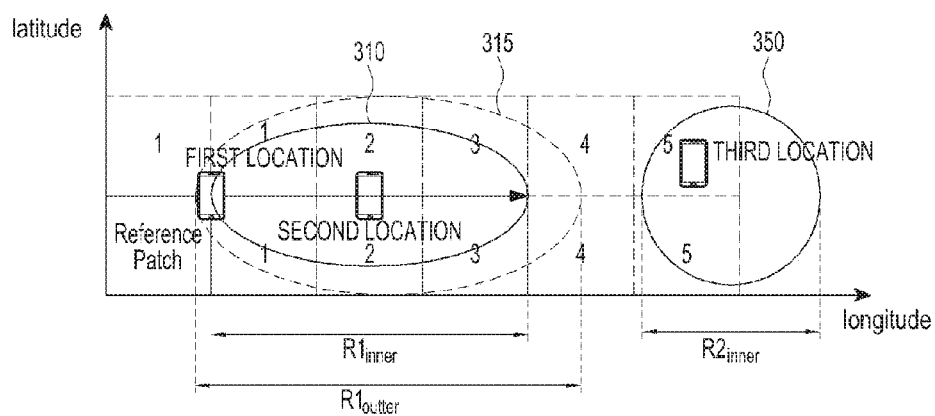

FIGS. 13A to 13C are diagrams illustrating examples for describing a method for determining a search scope upon searching for a radio map corresponding to transmitting end information in a memory of an electronic device, according to an embodiment of the present disclosure.

Referring to FIG. 13A, when the GCI of the inner coverage 310 of the serving cell at the previous location (e.g., a first location) is the same as the GCI of the inner coverage of the serving cell contained in the transmitting end information received at the current location (e.g., a third location), the electronic device may be determined to be located within the inner coverage 310 of the serving cell at the previous location. Accordingly, the number of tiers (e.g., three tiers) of neighbor patches from the ref patch may be determined to include the length ($R1_{inner}$) of the longer axis of the inner coverage of the serving cell at the previous location, with the patch corresponding to the previous location (e.g., the first location) set to the ref patch. For example, the number of tiers may be represented as shown in Equation (1) below.

$$R1_{outer} = n_{Tier} \times \text{Longitudinal length of patch; and}$$

$$n_{Tier} = R1_{outer}/\text{Longitudinal length of patch} \qquad (1)$$

Here, $R1_{outer}$ denotes the length of the longer axis of the outer coverage of the serving cell of the first transmitting end attached at the previous location of the electronic device, and $n_{Tier}$ denotes the number of tiers of the neighbor patches from the ref patch.

Referring to FIG. 13B, when the PCI of the outer coverage 315 of the serving cell at the previous location (e.g., a first location) is included in the PCI of the inner coverage 350 of the serving cell contained in the transmitting end information received at the current location (e.g., a third location), the electronic device may be determined to be located within the outer coverage 315 of the serving cell at the previous location. Accordingly, the number of tiers (e.g., four tiers) of neighbor patches from the ref patch may be determined to include the length ($R1_{outer}$) of the longer axis of the outer coverage 315 of the serving cell at the previous location, with the patch corresponding to the previous location (e.g., the first location) set to the ref patch. For example, the number of tiers may be represented as shown in Equation (2) below.

$$R1_{outer} < n_{Tier} \times \text{Longitudinal length of patch; and}$$

$$n_{Tier} > R1_{outer}/\text{Longitudinal length of patch} \quad (2)$$

Here, $R1_{outer}$ denotes the length of the longer axis of the outer coverage of the serving cell of the first transmitting end attached at the previous location of the electronic device, and $n_{Tier}$ denotes the number of tiers of the neighbor patches from the ref patch.

Referring to FIG. 13C, unless the GCI or PCI at the previous location (e.g., the first location) is included in at least one of the GCI or PCI of the serving cell included in the transmitting end information currently received, the electronic device may be determined to have been fully off (or away from) the previous location. Accordingly, the number of tiers (e.g., five tiers) of neighbor patches from the ref patch may be determined to include a predetermined multiple (e.g., M multiple) of the length of the longer axis of the outer coverage 315 of the serving cell at the previous location, with the patch corresponding to the previous location (e.g., the first location) set to the ref patch. For example, the number of tiers may be represented as shown in Equation (3) below.

$$M \times R1_{outer} < n_{Tier} \times \text{Longitudinal length of patch; and}$$

$$(M \times R1_{outer})/\text{Longitudinal length of patch} < n_{Tier} \quad (3)$$

Here, $R1_{outer}$ denotes the length of the longer axis of the outer coverage of the serving cell of the first transmitting end attached at the previous location of the electronic device, the radius of the outer coverage of the transmitting end (the length of the longer axis if it is elliptical in shape), and $n_{Tier}$ denotes the number of tiers of the neighbor patches from the ref patch. Further, M may be a constant which may previously and arbitrarily be set. According to an embodiment of the present disclosure, M may previously be set based on the previous location information and movement speed of the electronic device 801 or the density of the at least one transmitting end (e.g., the size of the outer coverage 315 of the serving cell at the previous location (e.g., the first location) and the inner coverage 350 of the serving cell at the current location). For example, as the latitude of the area where the electronic device 801 is situated, the movement speed of the electronic device 801, or the coverage size of each transmitting end increase, more tiers of patches need to be searched for, and thus, the number of tiers may increase.

Further, since, as the density of at least one transmitting end increases, the coverage of each transmitting end may be rendered smaller, the number of tiers may decrease. Therefore, the electronic device 801 may set a proper M value based on the same.

According to an embodiment of the present disclosure, the electronic device 801 may determine the validity of at least one or more radio maps searched. For example, upon receiving the one or more radio maps searched from at least one of the first memory 815-1, the second memory 815-2, the third memory 825-1, or the server 806, corresponding to the first to third requests, the first controller 811 of the electronic device 801 may determine the validity of the one or more radio maps received.

According to an embodiment of the present disclosure, when a radio map is one corresponding to the serving cell included in the received transmitting end information, the electronic device 801 may determine whether the valid period for the radio map has expired. When the valid period is not yet expired, the electronic device 801 may determine that the radio map corresponding to the serving cell is valid.

According to an embodiment of the present disclosure, when a radio map is one corresponding to a neighbor cell contained in the received transmitting end information, the electronic device 801, because it lacks an MCC, MNC, or GCI which is a key value indicating a cell, may determine the validity of neighbor cells using the coverage of the serving cell and the coverage of the neighbor cells. For example, when dual coverage is used upon estimating the location of the electronic device 801, it may determine whether there is an overlapping area using the inner coverage of the serving cell and the outer coverage of the neighbor cells. When there is an overlapping area, the electronic device 801 may determine that the radio map corresponding to the neighbor cell included in the received transmitting end information is valid.

According to an embodiment of the present disclosure, when the inner coverage of the serving cell and the outer coverage of the neighbor cell are circular in shape, and if the distance between the center of the inner coverage of the serving cell and the center of the outer coverage of the neighbor cell is less than or equal the sum of the radius of the inner coverage and the radius of the outer coverage, the serving cell may determine that there is an overlap between the inner coverage and the outer coverage. According to an embodiment of the present disclosure, determining whether there is an overlapping area using the inner coverage of the serving cell and the outer coverage of the neighbor cells when the inner coverage of the serving cell and the outer coverage of the neighbor cell are rectangular in shape is described below in greater detail with reference to FIG. 14.

Figure 14:
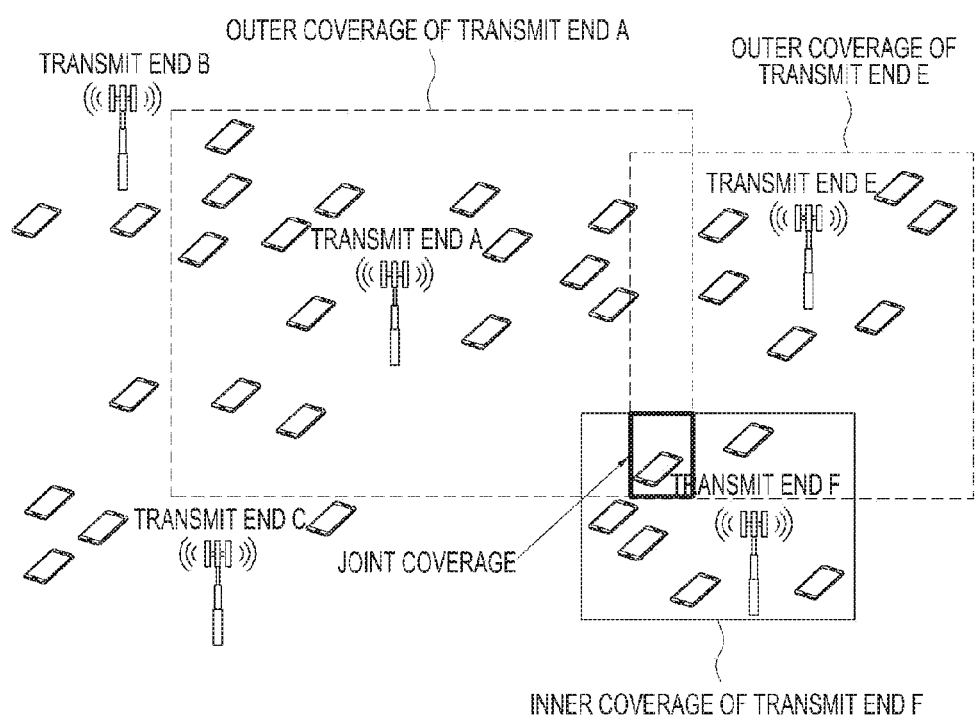
FIG. 14 is a diagram illustrating an example of common coverage, according to an embodiment of the present disclosure.

FIG. 14 is a diagram illustrating an example of common coverage, according to an embodiment of the present disclosure.

Referring to FIG. 14, the electronic device 801 may obtain the inner coverage information about the serving cell from the at least one radio map corresponding to the received transmitting end information. Also, the electronic device 801 may obtain the outer coverage information about at least one neighbor cell from the at least one radio map corresponding to the received transmitting end information. Whether there is joint coverage where the inner coverage and at least one outer coverage area overlap may be determined based on the obtained outer coverage information about at least one neighbor cell and the inner coverage information about the serving cell. When there is the joint coverage, the electronic device 801 may determine that the at least one radio map corresponding to the neighbor cell included in the received transmitting end information is valid. The electronic device 801, when multiple neighbor cells are included in the received transmitting end information, may individually perform the validity determination for the radio map corresponding to each neighbor cell.

According to an embodiment of the present disclosure, an electronic device comprises a communication interface and a first processor and a second processor, wherein the first processor may be configured to receive first base station information from at least one base station, search a first memory for at least part of first wireless information corresponding to the received first base station information, and when the at least part of the first wireless information is not searched in the first memory, send a request for at least part of second wireless information corresponding to the first base station information to the second processor, and the second processor may be configured to search a second memory for the at least part of the second wireless information based on the request. According to an embodiment of the present disclosure, the second wireless information may include the first wireless information.

According to an embodiment of the present disclosure, the first base station information may include network information, identification information, and measurement information about the at least one base station, and the network information may include information about at least one of a mobile country code (MCC), a mobile network code (MNC), or a radio access technology (RAT), the identification information may include information about at least one of a global cell identifier (GCI), a physical cell identifier (PCI), or a frequency channel number (FCN), and the measurement information may include information about at least one of a received signal strength indicator (RSSI), a reference signal received power (RSRP), a reference signal received quality (RSRQ), a reference signal code power (RSCP), a signal to noise ratio (SNR), or a time advance (TA).

According to an embodiment of the present disclosure, the second processor may be configured to, when the at least part of the second wireless information is not searched in the second memory, send a request for at least part of third wireless information corresponding to the first base station information to a server.

According to an embodiment of the present disclosure, the third wireless information may include the second wireless information.

According to an embodiment of the present disclosure, the first processor may be configured to receive at least part of the first wireless information or the second wireless information responsive to the request from at least one of the first memory or the second memory.

According to an embodiment of the present disclosure, the first processor may be configured to determine whether a valid period preset for the at least part of the first wireless information or the second wireless information received from the at least one of the first memory or the second memory expires, and when the valid period preset for the received at least part of the first wireless information or the second wireless information expires, send a request for third wireless information containing the received at least part of the first wireless information or the second wireless information to a server.

According to an embodiment of the present disclosure, the first processor may be configured to determine whether there is joint coverage where a plurality of coverage areas corresponding to the received at least part of the first wireless information or the second wireless information overlap, and when the joint coverage is absent, send a request for the third wireless information containing the received at least part of the first wireless information or the second wireless information to the server.

According to an embodiment of the present disclosure, the second processor may be configured to receive, from the server, at least part of the third wireless information received corresponding to the request from the second processor, extract at least part of the second wireless information corresponding to the request from the first processor from the received third wireless information and store the extracted part in the second memory, and transmit the extracted at least part of the second wireless information to the first processor.

According to an embodiment of the present disclosure, the first processor may be configured to extract at least part of the first wireless information corresponding to the received first base station information from at least part of the second wireless information transmitted from the second processor and store the extracted part in the first memory.

According to an embodiment of the present disclosure, the first processor and the second processor may be configured to determine a search scope based on at least one of previous location information and movement speed of the electronic device or a coverage size of the first base station information upon searching for the at least part of the first wireless information or the second wireless information.

According to an embodiment of the present disclosure, the first processor and the second processor may be configured to determine that the search scope is a scope corresponding to inner coverage of a serving cell at a previous location of the electronic device when the inner coverage of the serving cell included in the first base station information is consistent with base station information about the inner coverage of the serving cell at the previous location of the electronic device.

According to an embodiment of the present disclosure, the first processor and the second processor may be configured to determine that the search scope is a scope corresponding to outer coverage of a serving cell at a previous location of the electronic device when the outer coverage of the serving cell included in the first base station information is consistent with base station information about the outer coverage of the serving cell at the previous location of the electronic device.

Figure 15:
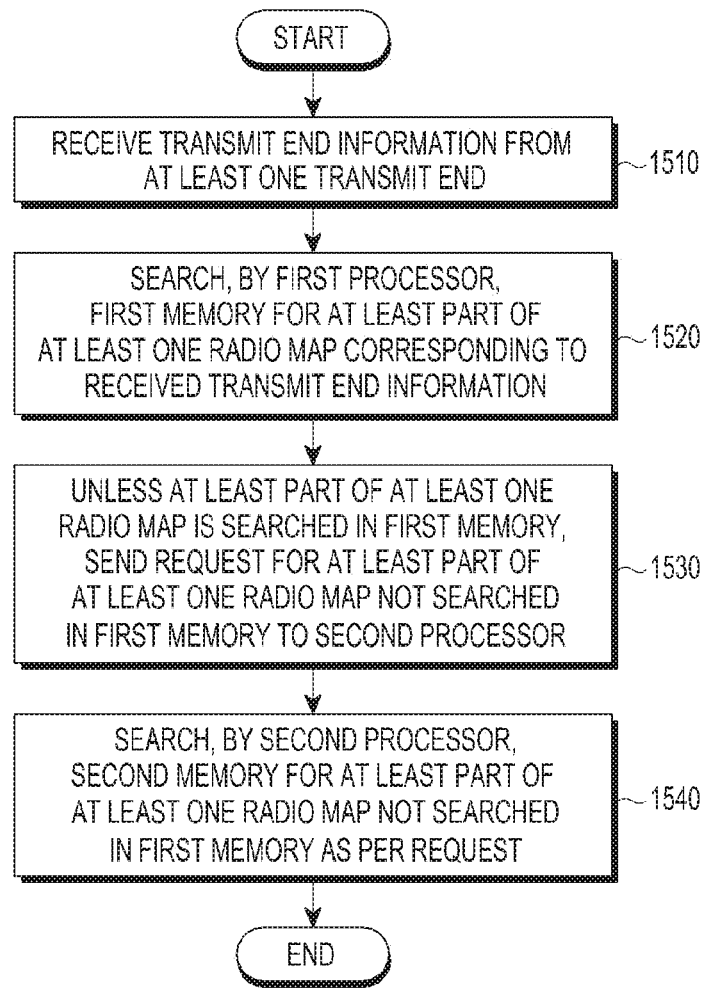
FIG. 15 is a flowchart of an information management method of an electronic device, according to an embodiment of the present disclosure.

FIG. 15 is a flowchart of an information management method of an electronic device, according to an embodiment of the present disclosure.

The DB management method of the electronic device may be performed by any one of the previously described electronic devices (e.g., the electronic device 701) or processors (e.g., the processor 120, the first processor 710, or the second processor 720) of the electronic device.

In step 1510, the electronic device may receive transmitting end information from at least one transmitting end, for example.

According to an embodiment of the present disclosure, the transmitting end information may include first transmitting end information provided from a first transmitting end corresponding to a serving cell and second transmitting end information provided from each of at least one second transmitting end corresponding to at least one neighbor cell.

According to an embodiment of the present disclosure, the first transmitting end information provided from the first transmitting end corresponding to the serving cell may include first network information and second cell information. For example, the first network information may include information about at least one of an MCC, an MNC, an RAT, or a TAC. The second cell information may include information about at least one of a GCI, a PCI, an FCN, an RSSI, an RSRQ, an SNR, an RSRP, an RSCP, or a TA.

According to an embodiment of the present disclosure, the second transmitting end information provided from the second transmitting ends corresponding to the at least one neighbor cell may include second cell information about each corresponding transmitting end. For example, the second cell information may include at least one of a PCI, an FCN, a RSSI, an RSRP, an RSRQ, or an RSCP.

In step 1520, the first processor in the electronic device, including a first memory storing a first radio map, may search the first memory for at least part of at least one radio map corresponding to the received transmitting end information. For example, when at least one piece of transmitting end information is received, the first processor of the electronic device may send a first request for at least part of at least one radio map corresponding to the at least one transmitting end information to a first database (DB) manager managing the first memory.

As per the first request, the first DB manager may search at least one of the first database storing the latest cell information of the transmitting end information about the transmitting end accessed latest in the first memory or the second database storing latest first patch information for the at least one radio map consistent with at least part of the received transmitting end information.

Further, unless the at least one radio map consistent with the at least part of the received transmitting end information is searched in at least one of the first database or the second database, the first processor may search at least one of a third database storing the first patch information in the first memory or a fourth database storing a patch map generated based on the first patch information for the at least part of the at least one radio map consistent with the at least part of the transmitting end information not searched.

In step 1530, unless the at least part of the at least one radio map is searched in the first memory, the electronic device may send a request for the at least part of the at least one radio map not searched in the first memory to the second processor. For example, unless the at least part of the at least one radio map consistent with the at least part of the transmitting end information not searched in at least one of the third database or the fourth database is searched, the first DB manager of the first processor may send a second request for the at least part of the at least one radio map consistent with the transmitting end information not searched to the second processor.

In step 1540, the electronic device may search the second memory for the at least part of the at least one radio map not searched in the first memory. For example, the second processor, upon receiving the second request from the first DB manager, may transfer the same to the second DB manager of the second processor. As per the second request, the second DB manager may search the fifth database storing the second patch information containing the first patch information for the at least part of the at least one radio map consistent with at least part of the transmitting end information not searched. Further, unless the at least part of the at least one radio map is searched in the fifth database, a third request for the at least part of the at least one radio map consistent with the at least part of the transmitting end information not searched may be sent to a server.

Figure 16:
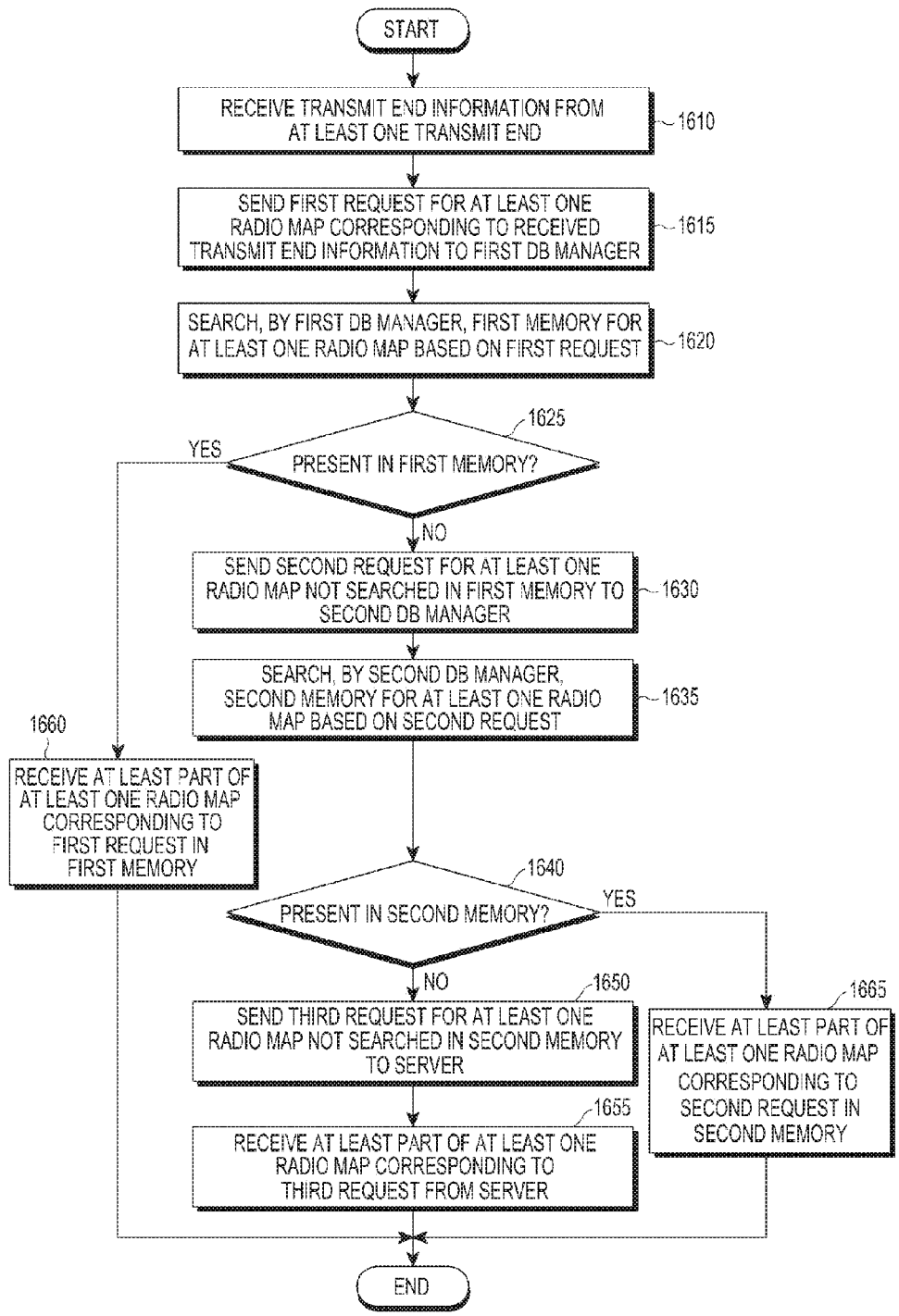
FIG. 16 is a flowchart of an information management method of an electronic device, according to an embodiment of the present disclosure.

FIG. 16 is a flowchart of an information management method of an electronic device, according to an embodiment of the present disclosure.

The DB management method of the electronic device may be performed by any one of the previously described electronic devices (e.g., the electronic device 801) or processors (e.g., the processor 120, the first processor 710, or the second processor 820) of the electronic device.

In step 1610, the first processor of the electronic device may receive transmitting end information from at least one transmitting end. Step 1610 is the same as step 1510 of FIG. 15, and, therefore, a description thereof is omitted.

In step 1615, the first processor of the electronic device may send a first request for at least part of the at least one radio map corresponding to at least one piece of transmitting end information to the first database (DB) manager managing the first memory in the first processor.

In step 1620, the first DB manager of the electronic device may search the first memory for the at least part of the at least one radio map corresponding to the received transmitting end information based on the first request. Step 1620 is the same as operation 1520 of FIG. 15, and, therefore, a description thereof will be omitted.

In step 1625, for example, the first DB manager of the electronic device may determine whether the at least part of the at least one radio map corresponding to the received transmitting end information is present in the first memory. When the at least part of the at least one radio map corresponding to the received transmitting end information is determined to be present in operation 1625, step 1660 is performed, and unless present, step 1630 may proceed.

In step 1630, for example, the first DB manager of the electronic device may send a second request for the at least part of the at least one radio map consistent with the at least part of the transmitting end information not searched in the first memory to the second DB manager managing the second memory in the second processor.

In step 1635, the second DB manager of the electronic device may search the second memory in the second processor for the at least part of the at least one radio map corresponding to the transmitting end information not searched in the first memory based on the second request.

In step 1640, the second DB manager of the electronic device may determine whether the at least part of the at least one radio map corresponding to the transmitting end information not searched in the first memory is present in the second memory. When the at least part of the at least one radio map corresponding to the transmitting end information not searched in the first memory is determined to be present in the second memory in step 1625, step 1665 is performed, and if absent, step 1650 may be carried out.

In step 1650, the second DB manager of the electronic device may send a third request for the at least part of the at least one radio map consistent with the at least part of the transmitting end information not searched in the second memory to the server.

In step 1655, the second DB manager of the electronic device may receive the at least part of the at least one radio map corresponding to the third request from the server.

According to an embodiment of the present disclosure, the second DB manager may store the received at least part of the at least one radio map in the second memory, extract the at least part of the at least one radio map corresponding to the second request from the received at least part of the at least one radio map, and transmit the extracted part to the first DB manager of the first processor. The first DB manager may store the at least part of the at least one radio map extracted from the second processor in the first memory.

Also, the first DB manager may transmit the extracted at least part of the at least one radio map to the controller of the first processor. The controller of the first processor may use the extracted at least part of the at least one radio map to estimate the location of the electronic device.

According to an embodiment of the present disclosure, a method for managing information by an electronic device may comprise receiving first base station information from at least one base station, searching a first memory for at least part of first wireless information corresponding to the received first base station information by a first processor including the first memory storing the first wireless information, when the at least part of the first wireless information is not searched in the first memory, sending a request for at least part of second wireless information corresponding to the first base station information to a second processor, and searching a second memory for the at least part of the second wireless information based on the request by the second processor.

According to an embodiment of the present disclosure, the second wireless information may include the first wireless information.

According to an embodiment of the present disclosure, the first base station information may include network information, identification information, and measurement information about the at least one base station, and the network information may include information about at least one of a mobile country code (MCC), a mobile network code (MNC), or a radio access technology (RAT), the identification information may include information about at least one of a global cell identifier (GCI), a physical cell identifier (PCI), or a frequency channel number (FCN), and the measurement information may include information about at least one of a received signal strength indicator (RSSI), a reference signal received power (RSRP), a reference signal received quality (RSRQ), a reference signal code power (RSCP), a signal to noise ratio (SNR), or a time advance (TA).

According to an embodiment of the present disclosure, the method may further comprise determining, by the second processor, whether at least part of the second wireless information is searched in the second memory, when the at least part of the second wireless information is not searched in the second memory, sending a request for at least part of third wireless information corresponding to the received first base station information to a server, and receiving the at least part of the third wireless information from the server.

According to an embodiment of the present disclosure, the third wireless information may include the second wireless information.

According to an embodiment of the present disclosure, the method may further comprise receiving at least part of the first wireless information or the second wireless information responsive to the request from at least one of the first memory or the second memory.

According to an embodiment of the present disclosure, the method may further comprise determining, by the first processor, whether a valid period preset for the at least part of the first wireless information or the second wireless information received from the at least one of the first memory or the second memory expires, and when the valid period preset for the received at least part of the first wireless information or the second wireless information expires, sending a request for third wireless information containing the received at least part of the first wireless information or the second wireless information to a server.

According to an embodiment of the present disclosure, the method may further comprise determining, by the first processor, whether there is joint coverage where a plurality of coverage areas corresponding to the received at least part of the first wireless information or the second wireless information overlap, and when the joint coverage is absent, sending a request for the third wireless information containing the received at least part of the first wireless information or the second wireless information to the server.

According to an embodiment of the present disclosure, the method may further comprise receiving, by the second processor, from the server, at least part of the third wireless information received corresponding to the request from the second processor, extracting at least part of the second wireless information corresponding to the request from the first processor from the received third wireless information and storing the extracted part in the second memory, and transmitting the extracted at least part of the second wireless information to the first processor.

According to an embodiment of the present disclosure, the method may further comprise extracting, by the first processor, at least part of the first wireless information corresponding to the received first base station information from at least part of the second wireless information transmitted from the second processor and storing the extracted part in the first memory.

According to an embodiment of the present disclosure, the method may further comprise determining, by the first processor and the second processor, a search scope based on at least one of previous location information and movement speed of the electronic device or a coverage size of the first base station upon searching for the at least part of the first wireless information or the second wireless information.

According to an embodiment of the present disclosure, determining the search scope may include determining, by the first processor and the second processor, that the search scope is a scope corresponding to inner coverage of a serving cell at a previous location of the electronic device when the inner coverage of the serving cell included in the first base station information is consistent with base station information about the inner coverage of the serving cell at the previous location of the electronic device.

According to an embodiment of the present disclosure, determining the search scope may include determining, by the first processor and the second processor, that the search scope is a scope corresponding to outer coverage of a serving cell at a previous location of the electronic device when the outer coverage of the serving cell included in the first base station information is consistent with base station information about the outer coverage of the serving cell at the previous location of the electronic device.

According to an embodiment of the present disclosure, there is provided a storage medium recording a program including commands configured to, when executed by at least one processor, enable the at least one processor to perform at least one operation including receiving first base station information from at least one base station, searching a first memory for at least part of first wireless information corresponding to the received first base station information by a first processor including the first memory storing the first wireless information, when the at least part of the first wireless information is not searched in the first memory, sending a request for at least part of second wireless information corresponding to the first base station information to a second processor, and searching a second memory for the at least part of the second wireless information based on the request by the second processor.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
   a communication interface; and
   a first processor and a second processor,
   wherein the first processor is configured to receive first base station information from a base station, search a first memory for first wireless information corresponding to the received first base station information, and when the first wireless information is not searched in the first memory, send a request for second wireless information corresponding to the first base station information to the second processor, and
   wherein the second processor is configured to search a second memory for the second wireless information based on the request for the second wireless information.

2. The electronic device of claim 1, wherein the second wireless information includes the first wireless information.

3. The electronic device of claim 1, wherein the first base station information includes network information, identification information, and measurement information about the base station, and
   wherein the network information includes information about a mobile country code (MCC), a mobile network code (MNC), or a radio access technology (RAT), the identification information includes information about a global cell identifier (GCI), a physical cell identifier (PCI), or a frequency channel number (FCN), and the measurement information includes information about a received signal strength indicator (RSSI), a reference signal received power (RSRP), a reference signal received quality (RSRQ), a reference signal code power (RSCP), a signal to noise ratio (SNR), or a time advance (TA).

4. The electronic device of claim 1, wherein the second processor is further configured to, when the second wireless information is not searched in the second memory, send a request for third wireless information corresponding to the first base station information to a server.

5. The electronic device of claim 4, wherein the third wireless information includes the second wireless information.

6. The electronic device of claim 1, wherein the first processor is further configured to receive the first wireless information or the second wireless information in response to the request from the first memory or the second memory.

7. The electronic device of claim 6, wherein the first processor is further configured to determine whether a valid period preset for the first wireless information or the second wireless information received from the first memory or the second memory expires, and when the valid period preset for the received first wireless information or the second wireless information expires, send a request for third wireless information containing the received first wireless information or the second wireless information to a server.

8. The electronic device of claim 7, wherein the first processor is further configured to determine whether there is joint coverage where a plurality of coverage areas corresponding to the received first wireless information or the second wireless information overlap, and when the joint coverage is absent, send a request for the third wireless information containing the received first wireless information or the second wireless information to the server.

9. The electronic device of claim 6, wherein the second processor is further configured to receive, from the server, third wireless information received corresponding to the request from the second processor, extract the second wireless information corresponding to the request from the first processor from the received third wireless information and store the extracted second wireless information in the second memory, and transmit the extracted second wireless information to the first processor.

10. The electronic device of claim 9, wherein the first processor is further configured to extract the first wireless information corresponding to the received first base station information from the second wireless information transmitted from the second processor and store the extracted first wireless information in the first memory.

11. The electronic device of claim 1, wherein the first processor and the second processor are further configured to determine a search scope based on at least one of previous location information and movement speed of the electronic device or a coverage size of the first base station information upon searching for the first wireless information or the second wireless information.

12. The electronic device of claim 11, wherein the first processor and the second processor are further configured to determine that the search scope is a scope corresponding to inner coverage of a serving cell at a previous location of the electronic device when the inner coverage of the serving cell included in the first base station information is consistent with base station information about the inner coverage of the serving cell at the previous location of the electronic device.

13. The electronic device of claim 11, wherein the first processor and the second processor are further configured to determine that the search scope is a scope corresponding to outer coverage of a serving cell at a previous location of the electronic device when the outer coverage of the serving cell included in the first base station information is consistent with base station information about the outer coverage of the serving cell at the previous location of the electronic device.

14. A method for managing information of an electronic device, the method comprising:
   receiving first base station information from a base station;
   searching a first memory for first wireless information corresponding to the received first base station information by a first processor including the first memory for storing the first wireless information;
   when the first wireless information is not searched in the first memory, sending a request for second wireless information corresponding to the first base station information to a second processor; and
   searching a second memory for the second wireless information based on the request for the second wireless information by the second processor.

15. The method of claim 14, further comprising:
   determining, by the second processor, whether the second wireless information is searched in the second memory;
   when the second wireless information is not searched in the second memory, sending a request for third wireless information corresponding to the received first base station information to a server; and
   receiving the third wireless information from the server.

16. The method of claim 14, further comprising receiving the first wireless information or the second wireless information responsive to the request for the second wireless information from at least one of the first memory or the second memory.

17. The method of claim 16, further comprising:
    determining, by the first processor, whether a valid period preset for the first wireless information or the second wireless information received from the at least one of the first memory or the second memory expires; and
    when the valid period preset for the received first wireless information or the second wireless information expires, sending a request for third wireless information containing the received first wireless information or the second wireless information to a server.

18. The method of claim 17, further comprising:
    determining, by the first processor, whether there is joint coverage where a plurality of coverage areas corresponding to the received first wireless information or the second wireless information overlap; and
    when the joint coverage is absent, sending a request for the third wireless information containing the received first wireless information or the second wireless information to the server.

19. The method of claim 16, further comprising:
    receiving, by the second processor, from the server, third wireless information received corresponding to the request from the second processor;
    extracting the second wireless information corresponding to the request from the first processor from the received third wireless information and storing the extracted second wireless information in the second memory; and
    transmitting the extracted second wireless information to the first processor.

20. The method of claim 19, further comprising extracting, by the first processor, the first wireless information corresponding to the received first base station information from the second wireless information transmitted from the second processor and storing the extracted first wireless information in the first memory.

* * * * *